US011898828B1

(12) United States Patent
Jankowski et al.

(10) Patent No.: US 11,898,828 B1
(45) Date of Patent: *Feb. 13, 2024

(54) CLOSED, SELF-CONTAINED BALLISTIC APOGEE DETECTION MODULE AND METHOD

(71) Applicant: Orbital Research Inc., Cleveland, OH (US)

(72) Inventors: Michael Jankowski, Winter Garden, FL (US); Anthony Opperman, Wickliffe, OH (US); Gerard Skebe, Eastlake, OH (US)

(73) Assignee: Orbital Research Inc., Cleveland, OH (US)

( * ) Notice: Subject to any disclaimer, the term of this patent is extended or adjusted under 35 U.S.C. 154(b) by 152 days.

This patent is subject to a terminal disclaimer.

(21) Appl. No.: 17/406,281

(22) Filed: Aug. 19, 2021

Related U.S. Application Data

(60) Continuation of application No. 16/398,497, filed on Apr. 30, 2019, now Pat. No. 11,125,543, which is a
(Continued)

(51) Int. Cl.
*F42B 15/01* (2006.01)
*B64C 13/16* (2006.01)
(Continued)

(52) U.S. Cl.
CPC .............. *F42B 15/01* (2013.01); *B64C 13/16* (2013.01); *F41G 7/008* (2013.01); *F41G 7/22* (2013.01);
(Continued)

(58) Field of Classification Search
CPC .......... F42B 15/01; F42B 10/14; F42B 10/32; F42B 10/62; F42B 30/10; B64C 13/16; F41G 7/008; F41G 7/22; F41G 7/30; F41G 7/306; F42C 15/00; G05D 1/0033; G05D 1/0094; G05D 1/12
(Continued)

(56) References Cited

U.S. PATENT DOCUMENTS 9,677,864 B1 * 6/2017 Jankowski .............. F41G 7/008
10,317,181 B1 * 6/2019 Jankowski .............. F42B 15/01
(Continued)

*Primary Examiner* — Tyler D Paige
(74) *Attorney, Agent, or Firm* — Brian Kolkowski

(57) ABSTRACT

A closed, self-contained ballistic apogee detection module for use in a projectile, such as a rocket, mortar round, or artillery round, fuses data from multiple built-in sensors, such as an accelerometer, a magnetometer, and a gyroscope, and processes the data using a microprocessor through a custom quaternion extended Kalman filter to provide accurate state and orientation information about the projectile so as to accurately predict apogee. The module outputs a signal indicating apogee detection or prediction which they projectile uses to initiate fuze arming, targeting control, airbody transformation, maneuvering, flow effector deployment or activation, payload exposure or deployment, and/or other mission activity. Because the system and method of the invention does not rely on external environmental data to detect apogee, it need not use a pressure sensor and can be completely sealed in and closed without requiring access to air from outside the projectile for barometric readings.

20 Claims, 12 Drawing Sheets

Related U.S. Application Data division of application No. 15/590,101, filed on May 9, 2017, now Pat. No. 10,317,181, which is a division of application No. 14/547,972, filed on Nov. 19, 2014, now Pat. No. 9,677,864.

(51) Int. Cl.

| | |
|---|---|
| *F41G 7/00* | (2006.01) |
| *F41G 7/22* | (2006.01) |
| *F41G 7/30* | (2006.01) |
| *F42B 10/14* | (2006.01) |
| *F42B 10/62* | (2006.01) |
| *G05D 1/00* | (2006.01) |
| *G05D 1/12* | (2006.01) |
| *F42C 15/00* | (2006.01) |
| *F42B 10/32* | (2006.01) |
| *F42B 30/10* | (2006.01) |

(52) U.S. Cl.
CPC ............... *F41G 7/30* (2013.01); *F41G 7/306* (2013.01); *F42B 10/14* (2013.01); *F42B 10/32* (2013.01); *F42B 10/62* (2013.01); *F42C 15/00* (2013.01); *G05D 1/0033* (2013.01); *G05D 1/0094* (2013.01); *G05D 1/12* (2013.01); *F42B 30/10* (2013.01)

(58) Field of Classification Search
USPC ............................................................ 701/4
See application file for complete search history.

(56) References Cited

U.S. PATENT DOCUMENTS

| | | | |
|---|---|---|---|
| 11,125,543 B1* | 9/2021 | Jankowski | ............... F42B 10/32 |
| 2007/0205320 A1* | 9/2007 | Zemany | ................ F41G 7/2293 |
| | | | 244/3.1 |
| 2007/0241227 A1* | 10/2007 | Zemany | ................ F41G 7/2293 |
| | | | 244/3.1 |
| 2012/0025008 A1* | 2/2012 | Geswender | ............. F42B 10/62 |
| | | | 244/3.2 |
| 2014/0330454 A1* | 11/2014 | Purpura | ................. B64D 45/00 |
| | | | 701/3 |

* cited by examiner

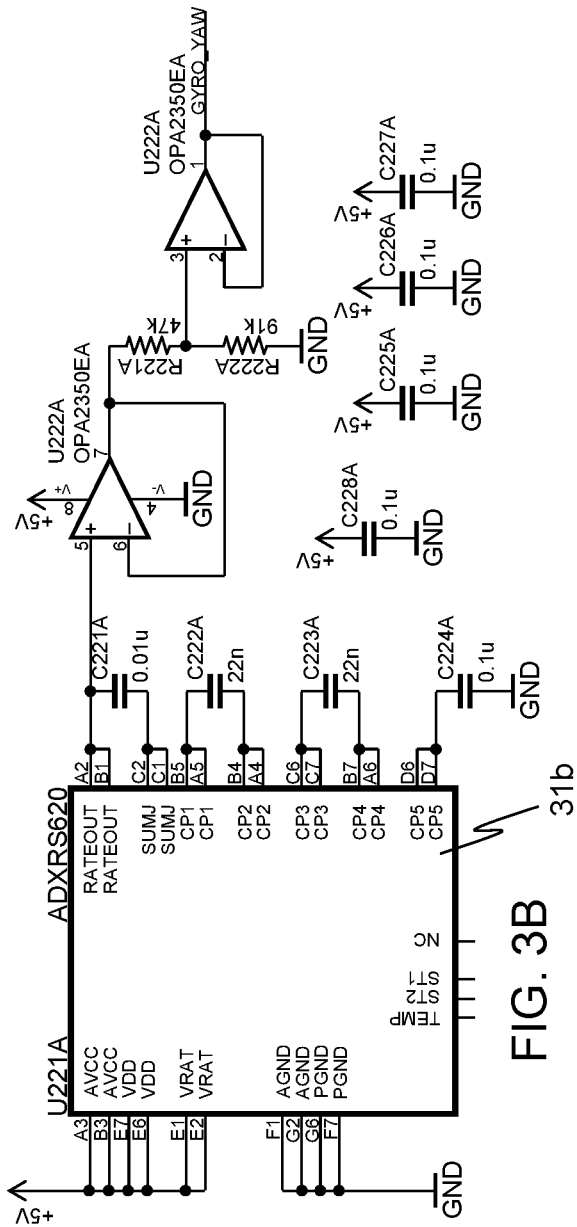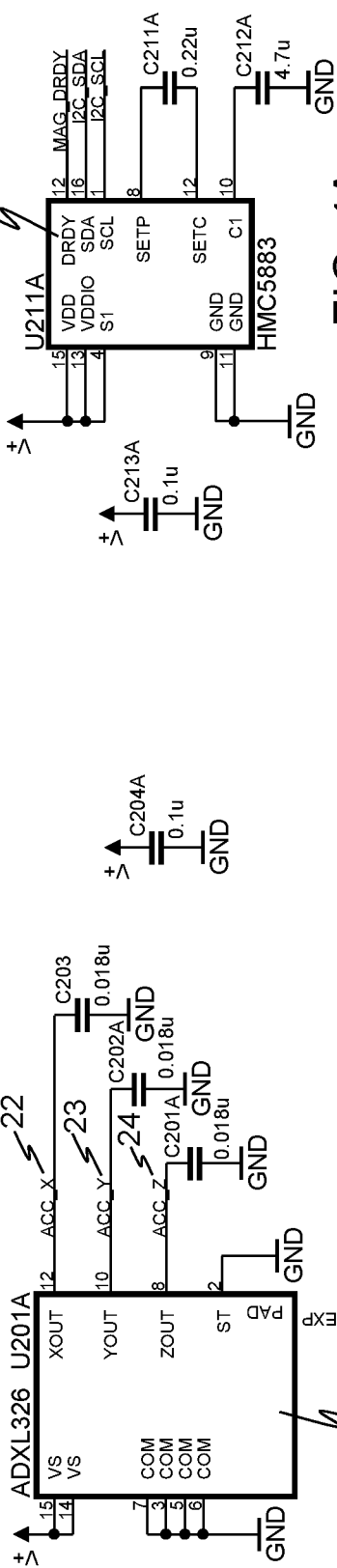

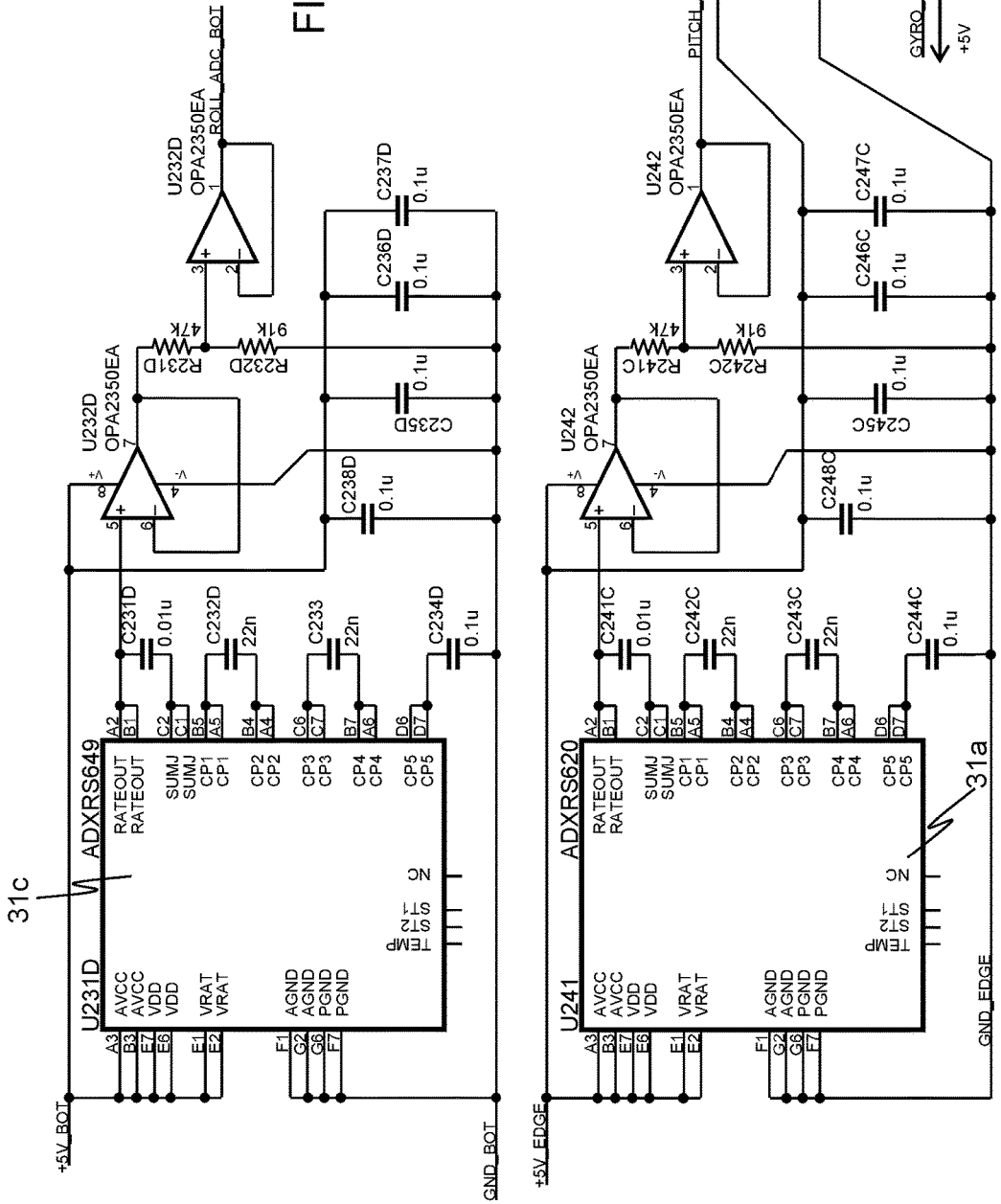

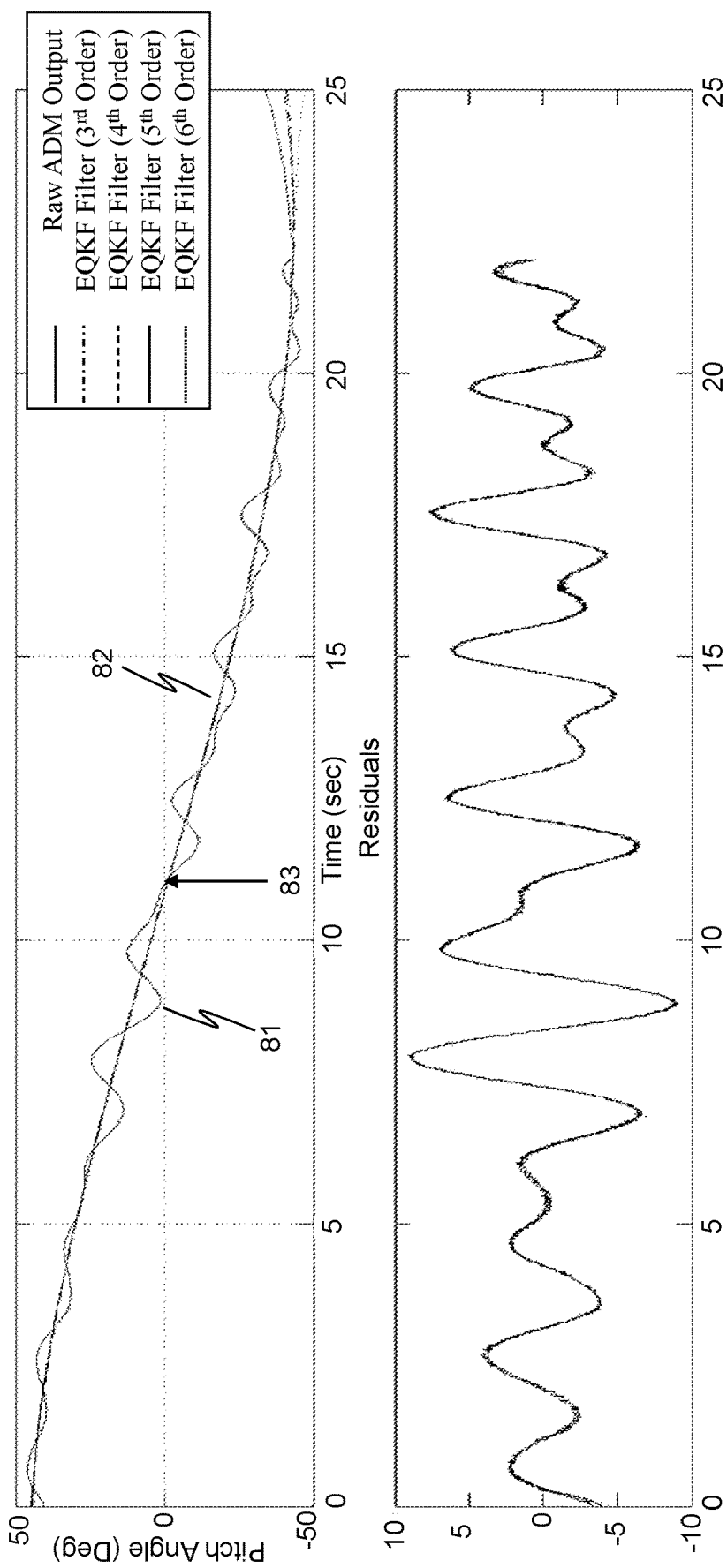

CLOSED, SELF-CONTAINED BALLISTIC APOGEE DETECTION MODULE AND METHOD

CROSS-REFERENCE TO RELATED APPLICATIONS

This application is a continuation of U.S. patent application Ser. No. 16/398,497, which was filed on Apr. 30, 2019 and which is a continuation of U.S. patent application Ser. No. 15/590,101, which was filed on May 9, 2017, issued as U.S. Pat. No. 10,317,181 on Jun. 11, 2019, and which is a division of U.S. patent application Ser. No. 14/547,972 which was filed on Nov. 19, 2014 and issued as U.S. Pat. No. 9,677,864 on Jun. 13, 2017.

BACKGROUND OF THE INVENTION

1. Field Of The Invention

The present invention relates to apogee detection for projectiles such as mortar rounds and rockets, and more specifically to apogee detection circuits for launched or fired ballistic projectiles. The present invention further relates to apogee detection in order to transform and/or guide projectiles. The present invention further relates to methods of detecting apogee. The present invention further relates to a methods of triggering arming of a projectile fuze, ignition of an on-board propulsion system, deployment or activation of control surfaces or flow effectors, activation of power-consumptive sensors or systems, initiation of range improvement or precision targeting systems, morphing or transformation of the projectile airbody including by the shedding of surfaces or release or exposure of a payload, and similar changes related to a new phase of projectile flight. The present invention further relates to methods of guiding glidable and/or steerable ballistic projectiles using guidance systems activated and powered only after an appropriate time based at least in part on the detection and/or prediction of apogee, including "man-in-the-loop" human guidance by radio-transmitted video signals and guidance signals.

2. Terminology And Technology Review

Ballistic apogee is the peak altitude (highest point) in an arcing projectile's trajectory, i.e., the roughly midflight point at which vertical velocity reaches zero. Apogee detection for projectiles such as munitions and rockets is useful for triggering an apogee-related event. In some cases this event may be the deployment of a drogue parachute to begin a descent phase and bring a rocket safely back to the ground, or the triggering of an arming or detonation process in the fuze of a weaponized projectile. In more advanced applications such as those to which the present invention may be adapted, apogee (or some time related to apogee) may trigger some other change related to a new phase of projectile flight, such as ignition of an on-board propulsion system, a deployment or morphing of control surfaces, an initiation of range improvement or precision targeting systems, a transformation of the projectile including by the shedding of surfaces or release of a payload, etc. As such, inaccurate apogee detection can lead to mistiming and failure of a mission-critical action. Thus, accurate detection—and, in some applications, accurate advance prediction—of ballistic apogee is a useful aim and still an unsolved problem for many of the challenges it presents.

The simplest type of apogee detector may use some mechanical mechanism to detect nose-over. A conductive ball bearing set loosely in a chamber, for example, may shift forward upon nose-over to complete a circuit and send a signal indicating that apogee has been reached. However, such a mechanism is unreliable, given that it may send (1) a false-positive indication of apogee if the projectile is buffeted in flight or the ball bearing is otherwise jostled into a circuit-completing position, or (2) a false-negative indication of apogee if the ball bearing (or other mechanical mechanism) becomes stuck or otherwise fails, possibly as the result of damage from g forces experienced on launch. Furthermore, such a mechanism may only detect apogee once it has already occurred, and cannot predict apogee, so as to signal the triggering of some event that should occur or begin some defined time prior to apogee. Given the drawbacks of purely mechanical apogee detectors, such devices should not be used for mission-critical applications.

Other apogee detectors are altimeter-based. Traditional projectile altimeters use one or more barometric sensors, or barometric sensors combined with accelerometric sensors, to determine altitude. Calculations are performed on the outputs of such sensor(s) to generate an estimate of the dynamic state. The accuracy of the estimate, and thus the usefulness of the altimeter, is improved by reducing and/or compensating for error that results from sensor measurement noise.

A barometric altimeter, for example, determines altitude by measuring the air pressure inside the projectile's electronics bay as a proxy for external static air pressure, and applying the atmospheric standard model to that measurement. The use of barometric altimeters have numerous disadvantages. For one, a fuze system using a barometric altimeter to detect apogee must be "air-breathing" in order to utilize pressure sensors. Permitting a barometric altimeter access to air adds costs from parts and routing, and presents undesirable aerodynamics design challenges because an airframe hole needed to supply air to a pressure sensor can create a vacuum that may need to be compensated for by the airframe design and can result in excess drag. Such "air-breathing" designs limit the altitude, velocity and robustness of the fuze system, as pressure sensors are highly sensitive to these parameters. Another downside results from the fact that the proxy measurement may not exactly match the actual external static air pressure and thus the resulting estimation may not always provide sufficient accuracy. Resultantly, apogee is generally "detected" at some minimum offset pressure from (peak altitude) minimum pressure, in order to ensure that a false apogee detection is not triggered by measurement system noise on ascent. Resultantly, such a system "detects" apogee later than apogee actually occurs. Filtering the sensor output to reduce noise likewise results in loss of response and apogee detection delay. Heuristic rules used to deal with onboard sensor noise or error, such as the application of mach delays with barometric altimeters to compensate for pressure errors as a projectile approaches and passes through the speed of sound, may further improve apogee detection, but heuristic approaches require anticipation of possible errors and creation of compensation rules. Given the various drawbacks of pressure-based approaches to detecting apogee, it would be desirable to be able to eliminate any barometric sensors from an apogee detector design.

In apogee detector designs that use accelerometers, the apogee detection works by integrating measured acceleration to find velocity, and pronouncing apogee detection at some threshold low vertical velocity. This approach has not been found to be as reliable as barometric-based approaches, and the integration process is computationally slow and accumulates error with each integration step. As with apogee detection based on barometric pressure, measurement noise reduces the accuracy of the apogee determination. Detection of apogee with an accelerometric measurement alone may not provide sufficient reliability for mission-critical applications, particularly in high-g scenarios.

Given noisy sensor measurements, a least-squares filtering method may improve trajectory estimation, but disadvantageously involves greater data storage and computation requirements. Usage of a Kalman filter, by contrast, provides a similar estimation fitted to a dynamic model instead of an arbitrary polynomial, and requires less storage of data history and less computational intensity because it is recursive (only the previous estimate is needed to calculate the next estimate) and a curve fit is not needed at each measurement.

As a result, apogee detectors that use accelerometry sensors generally also use air pressure sensors and rely at least in part on barometric pressure readings to detect apogee.

Existing apogee detection devices are also larger and heavier than desirable. Size and weight are important considerations for a component intended to be placed into a projectile, where free space is scarce and excess weight increases fuel/charge requirements or reduces range.

In view of the foregoing disadvantages of present apogee detection devices and methods, what is needed is an apogee detection system that does not rely on external environmental data to detect apogee, but instead provides an entirely self-contained modular system that relies on the projectile's attitude and motion to predict and detect apogee. Further what is needed is an apogee detection system that is capable of fusing data from multiple sensors to provide accurate state and orientation information about the projectile and thus to provide accurate prediction of the ballistic apogee of the projectile. Further what is needed is an apogee detector that does not rely on external environmental information or a priori knowledge to make the apogee prediction or detection. Further what is needed is an apogee detector that is computationally efficient, fast, and accurate. Further what is needed is an apogee detector that is small and lightweight. Further what is needed is an apogee detector that can easily be installed and replaced in a fuze or other part of a projectile with a minimum of connections/disconnections. Further what is needed is an apogee detector that can not only detect but also predict apogee and thus permit the projectile or fuze to initiate any number of mission processes, including but not limited to fuze arming, targeting control, airbody transformation, maneuvering, flow effector deployment or activation, and/or payload exposure or deployment.

SUMMARY OF THE INVENTION

The present invention relates to ballistic projectiles and further to systems for ballistic projectiles for predicting or detecting apogee. More specifically, the present invention relates to an apogee detector that can compute, from sensor data, projectile dynamic state in order to detect and/or predict ballistic apogee, or a projectile implementing such an apogee detector. More specifically, the invention relates to such a system that does not rely on barometric pressure or a priori knowledge fed to the apogee detector, and instead relies only on what the apogee detector senses with its own sensors, which need not include air pressure sensors.

For the purposes of this disclosure, "time related to apogee" should be understood to mean some predefined time either before or after a predicted or detected ballistic apogee. For example, if a fuze should be armed 5 seconds after apogee, the apogee detector of the present invention may send a signal indicating detected or predicted apogee to the fuze, and 5 seconds later the fuze will be armed. For another example, if a range-extending rocket motor built into the projectile should be fired exactly at apogee, but the rocket motor firing systems must begin the firing process 2 seconds before the time of firing, the apogee detector of the present invention may send a signal indicating that apogee is predicted in 2 seconds to the rocket firing motor systems, thus triggering the rocket to fire at the appropriate time (the moment of apogee). The initiation of the firing system, although not triggered at apogee, is triggered at a time related to apogee. "A time related to apogee" must not be construed to be any arbitrary time, however. A person skilled in the art would understand that such time must be defined in terms of apogee and must be pre-quantified in units of time.

Several different embodiments of the invention are envisioned. Some embodiments comprise an apogee detection module, while others involve an apogee detection module installed as part of a larger projectile system, providing the projectile with enhanced functionality. Still other embodiments are methods relating to use of the apogee detection module of the present invention to effect various initiations, activations, changes, transformations, armings, maneuvers or deployments in a projectile.

One embodiment of the invention is an apogee detector comprising at least three sensors, a microprocessor, and a connector for providing an output indicative of detected or predicted apogee. Preferably, the sensors comprise at least one three-axis accelerometer, at least one gyroscope, and at least one magnetometer. Preferably, the at least one gyroscope is used for detecting pitch angle change rate. Preferably, other orthogonal gyroscopes are also included for the detection of one or both of yaw and roll angle change rate. Preferably, the apogee detector is modular. Preferably, the components of the apogee detector are entirely enclosed and potted so as to be able to operably survive accelerations in excess of 10,000 g's. More preferably, the apogee detector is capable of operably surviving accelerations in excess of 13,000 g's. Still more preferably, the apogee detector is capable of operably surviving accelerations in excess of 18,000 g's. Preferably, the output indicative of detected or predicted apogee is computed by fusing and filtering signals from the at least three sensors with a Kalman filter. Preferably, the Kalman filter is an extended Kalman filter. More preferably, the extended Kalman filter is a quarternion extended Kalman filter. Still more preferably, the quaternion extended Kalman filter is a third-order quaternion extended Kalman filter. The Kalman filter may also, in related embodiments, be a fourth-, fifth-, sixth-, or seventh-order filter. Preferably, the microprocessor includes a nested vectored interrupt controller. Preferably, the apogee detector does not include a sensor for measuring air pressure.

Another embodiment of the invention is a self-contained module comprising at least one three-axis accelerometer, at least one gyroscope, at least one magnetometer, each outputting one or more sensor signals, and at least one computer processor, wherein the module is capable of detecting or predicting ballistic apogee by fusing and filtering the sensor signals with a quaternion extended Kalman filter in real time, and wherein the computer processor outputs a signal indicative of apogee having been detected or predicted, or estimated time to predicted apogee. Preferably, the module does not include a sensor for measuring air pressure.

Still another embodiment of the invention is a ballistic projectile comprising at least one three-axis accelerometer, at least one gyroscope, at least one magnetometer, each outputting one or more sensor signals, and at least one computer processor, wherein the projectile is capable of detecting or predicting ballistic apogee by fusing and filtering the sensor signals with a quaternion extended Kalman filter in real time, and wherein the computer processor outputs a signal indicative of apogee having been detected or predicted, or estimated time to predicted apogee. By real time, it is meant that the processing of sensor information—calculations, computations, and estimations—via the Kalman filter using the microprocessor is performed during flight, substantially instantaneously as the data arrives to the microprocessor from the sensors. Storing the data in a queue for processing at a later time is not "real time" processing, nor is transmission of the data to some off-board ground station or other networked processor (UAV, loitering aircraft, forward observer etc.) or other non-on-board processing system for processing. Performance of a simulation in advance of launch is also not "real time."Preferably, the real time processing is performed within a tenth of a microsecond after data is received from sensors. Real time processing is possible by sampling from the sensors on the order of tens of kilohertz and processing with a microprocessor with a clock speed on the order of tens of megahertz. Preferably, the projectile does not include a sensor for measuring air pressure. Preferably, the ballistic projectile further comprises one or more of (a) a warhead fuze capable of being armed either upon receiving a signal indicative of detected or predicted apogee or at some time related to the receipt of said signal; (b) one or more deployable or activatable control surfaces for maneuvering or stabilizing the projectile, for changing the maneuverability or stability of the projectile, or for extending the range or enhancing the precision of the projectile; (c) one or more deployable or activatable flow effectors for maneuvering or stabilizing the projectile, for changing the maneuverability or stability of the projectile, or for extending the range or enhancing the precision of the projectile; (d) one or more sheddable control surfaces for maneuvering or stabilizing the projectile, for changing the maneuverability or stability of the projectile, or for extending the range or enhancing the precision of the projectile; (e) one or more control surfaces movable along a track on the body of the projectile for maneuvering or stabilizing the projectile, for changing the maneuverability or stability of the projectile, or for extending the range or enhancing the precision of the projectile; (f) a transformable airframe; (g) one or more deployable micro air vehicles; and/or (h) one or more spinning spoilers for steering while the projectile is spinning. For the purposes of this application, the term "flow effectors" expressly excludes parachutes, drogue chutes, streamers, and the like devices. The deployable flow effectors of the present invention may include deployable wings, canards, strakes, spoilers, body fins, tailfins/vertical stabilizers, tailplanes/horizontal stabilizers, and winglets. For the purposes of this application, these structures must be construed to have mutually exclusive meanings. For example, a canard is a forward-placed structure and/or control surface, oriented horizontally or at some small angle therefrom, placed ahead of a wing (or, in any case, forward of the center of gravity, where a wing would be) instead of behind it on an afterbody or tail, and is thus distinguished from a tailplane/horizontal stabilizer, wing, or fin. A wing, by contrast, is a usually larger midbody structure, placed roughly in line with the center of mass of the projectile and oriented horizontally or at some small angle therefrom, capable of generating appreciable lift even at level angles of attack. These structures may comprise or may act as flaps, rudders, elevators, elevons, ailerons, and/or stabilators, as appropriate, each of which terms has a separate and distinct meaning in the art from the other terms and should not be blurred or confused when used in this application to claim or define certain structures. A person skilled in the art would appreciate that the named structures all function differently.

Other embodiments of the invention, related to the above embodiment, consist of a ballistic projectile having activatable or deployable flow effectors and comprising at least one three-axis accelerometer, at least one gyroscope, at least one magnetometer, each outputting one or more sensor signals, and at least one computer processor, wherein the projectile is capable of detecting or predicting ballistic apogee by fusing and filtering the sensor signals with a quaternion extended Kalman filter in real time, and wherein the computer processor outputs a signal indicative of apogee having been detected or predicted, or estimated time to predicted apogee. In one such embodiment, the deployable flow effectors comprise one or more spoilers positioned to affect flow over a deployable fin. In other such embodiment, the deployable flow effectors comprise deployable dihedral wings and deployable canards that are adjustable in their angle of attack after deployment by a beveled gear reduction mechanism in the body of the projectile. Preferably, in such an embodiment, the ballistic apogee prediction or signal indicative of time to predicted apogee activates deployment of the wings and canards in sequence at a time just before apogee, thus permitting the projectile to nose up and glide to a target with a desired glide ratio rather than falling in a ballistic trajectory. In this fashion, both the range and the precision of the projectile are substantially improved above what can be accomplished with ballistic flight alone, because the range is extended significantly by the glide ratio and a longer flight time provides extended opportunity for targeting and steering. In such an embodiment it may be desirable to locate a video camera or similar sensor in the underbody or lower nose of the projectile. In another such embodiment, the output signal indicative of detected or predicted apogee activates the deployment of steerable canards or other flow effectors that permit the projectile to be steered to a designated target. In another such embodiment, the signal indicative of detected or predicted apogee activates a high-power guidance system, which is preferably powered by a supercapacitor having a capacitance on the order of farads. Preferably, the high-power guidance system comprises a video camera housed in the nose of the projectile and a radio frequency (RF) transmitter capable of transmitting a video signal from the video camera at least 15 kilometers and receiving RF-transmitted guidance commands indicating a target within the view of the video camera. Preferably, the guidance system then activates and steers deployable canards or other flow effectors to steer the projectile to the indicated target based at least in part on the received guidance commands. Preferably, the guidance commands are supplied by and transmitted from a human recipient of the transmitted video signals, and a "man-in-the-loop"solution is provided to enhance targeting, reduce the possibility of collateral damage, and comply with applicable conventions. In some instances the human recipient may be a forward observer or the projectile launcher, may receive the video signals on a tablet computer or similar touch-screen video display and input device, and may hone projectile targeting in real time simply by placing a finger (or other suitable pointing device) on the intended target as shown on the display from the live video feed delivered from the airborne projectile. In such embodiments, the ADM system of the present invention is critical to prevent premature power-up of the targeting system, which could drain the projectile's limited power supply prior to the time that a targeting system could be effective, i.e., while the projectile is descending toward its target.

Yet another embodiment of the present invention is a method of arming a ballistic projectile comprising firing or launching a ballistic projectile having a fuze; a self-contained apogee detection module detecting or predicting the projectile's ballistic apogee by computing a ballistic trajectory estimate using a plurality of sensors each having a measurement signal associated therewith and a computer processor all within the projectile and without reference to barometric pressure; at the detected or predicted apogee or at some time related thereto, the apogee detection module transmitting a signal to the fuze that arms the fuze. Preferably, the sensors include at least an accelerometer, a magnetometer, and a gyroscope, but do not include a pressure sensor. Preferably, the computer processor fuses and processes the measurement signals using a quaternion extended Kalman filter to provide the ballistic trajectory estimate. Preferably, the computation is performed without any a priori knowledge of the projectile's intended ballistic trajectory. Preferably, the computer processor is operated at 98% capacity with only 2% capacity needed for overhead tasks. Preferably, no GPS is needed to make the apogee detection or prediction.

In yet another embodiment, the invention is a method of steering a ballistic projectile comprising firing or launching a ballistic projectile; detecting or predicting the projectile's ballistic apogee by computing a ballistic trajectory estimate using a plurality of sensors each having a measurement signal associated therewith and a computer processor all enclosed entirely within the projectile and without reference to barometric pressure; and at the detected or predicted apogee or at some time related thereto, actuating at least one flow effector to steer the ballistic projectile. Preferably, the sensors include at least an accelerometer, a magnetometer, and a gyroscope, but do not include a pressure sensor. Preferably, the computer processor fuses and processes the measurement signals using a quaternion extended Kalman filter to provide the ballistic trajectory estimate. Preferably, the computation is performed without any a priori knowledge of the projectile's dynamic state or the projectile's intended ballistic trajectory. Preferably, the flow effector is a wing or a canard extended beyond the caliber of the projectile and for which the angle of attack is adjusted after extension.

In yet another embodiment, the invention is a method of reconfiguring the airframe of a ballistic projectile comprising: firing or launching a ballistic projectile having devices or systems for reconfiguring the airframe; a self-contained apogee detection module detecting or predicting the projectile's ballistic apogee by computing a ballistic trajectory estimate using a plurality of sensors each having a measurement signal associated therewith and a computer processor all within the projectile and without reference to barometric pressure; at the detected or predicted apogee or at some time related thereto, the apogee detection module transmitting a signal to the devices or systems for reconfiguring the airframe; and the devices or systems for reconfiguring the airframe then reconfiguring the airframe by extending, retracting, shedding, jettisoning, telescoping, inflating/ballooning, hinging, exploding, opening, or closing some part of the airframe, including one or more control surfaces, or by moving a control surface along a track. Preferably, the sensors include at least an accelerometer, a magnetometer, and a gyroscope, but do not include a pressure sensor. Preferably, the computer processor fuses and processes the measurement signals using a quaternion extended Kalman filter to provide the ballistic trajectory estimate. Preferably, the computation is performed without any a priori knowledge of the projectile's intended ballistic trajectory. Preferably, the computer processor is operated at 98% capacity with only 2% capacity needed for overhead tasks. Preferably, no GPS is needed to make the apogee detection or prediction.

Additional features and advantages of the invention will be set forth in the detailed description which follows, and in part will be readily apparent to those skilled in the art from that description or recognized by practicing the invention as described herein, including the detailed description which follows, the claims, as well as the appended drawings. It will further be understood that that any of the above-described embodiments may be hybridized to combine their various features/advantages.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention and together with the description serve to explain the principles and operation of the invention.

BRIEF DESCRIPTION OF THE DRAWINGS

FIG. 2A. Schematic block diagram for an accelerometer.
FIGS. 3A-C. Schematic block diagrams for gyroscopes.
FIG. 4A. Schematic block diagram for a magnetometer.
FIG. 8A. Data plot showing Kalman filter output for pitch angle for 3rd, 4th, 5th, and 6th order Kalman filters, with an arrow indicating the time of apogee.
FIG. 8B. Enhancement of FIG. 8A showing little difference between 3rd, 4th, 5th, and 6th order Kalman filters.

DETAILED DESCRIPTION OF THE INVENTION

Figure 1:
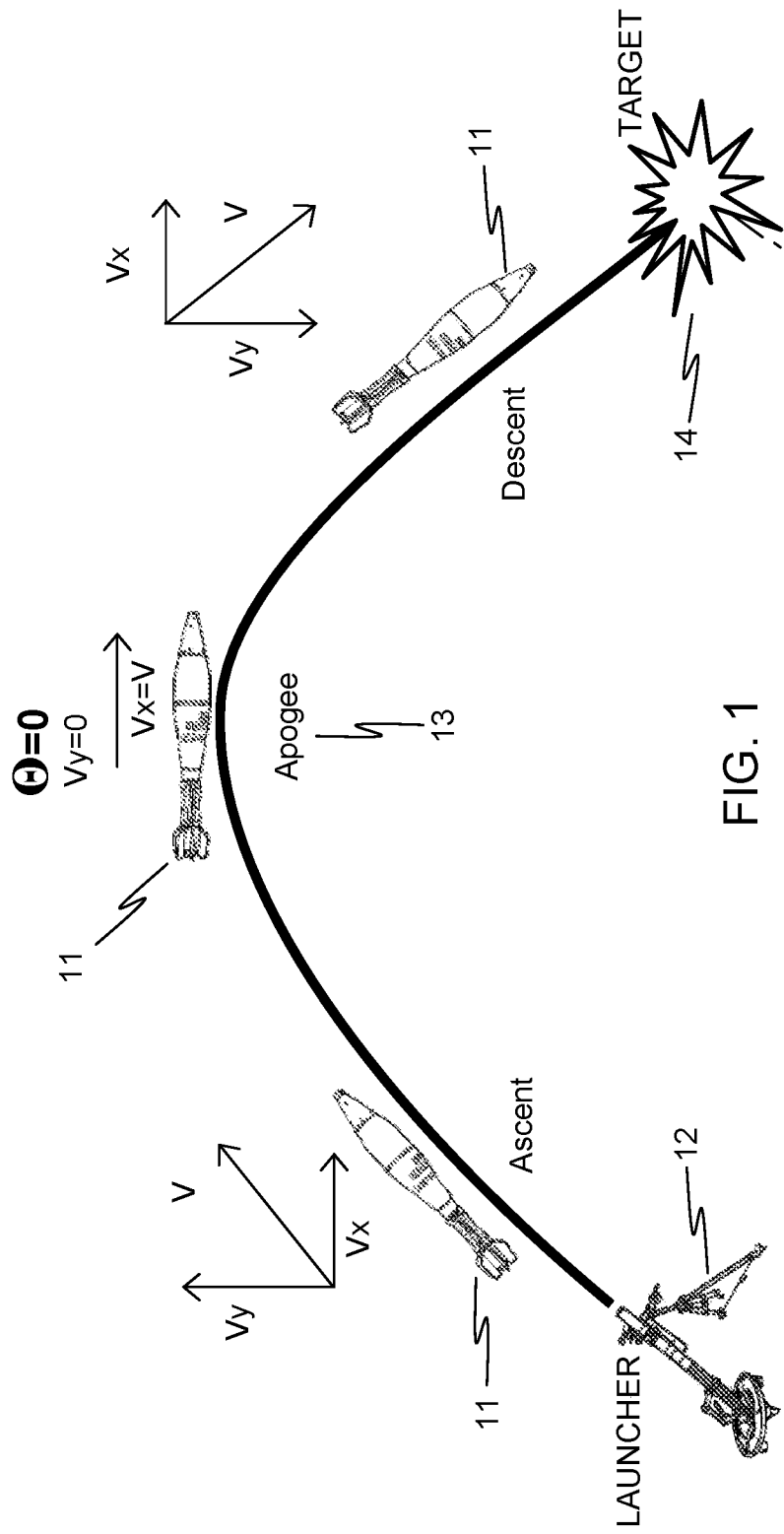
FIG. 1. Diagram showing a typical ballistic flight of a mortar.

The invention consists of various embodiments comprising or making use of the apogee detection module described herein. The apogee detection module (ADM) of the present invention works to provide projectile dynamic state information and hence the prediction or detection of ballistic apogee, and does so preferably without sensing, measuring, or computing altitude and more specifically without sensing air pressure. As such, it need not include or receive information from an air pressure sensor and need not be open or exposed to the projectile's external environment.

In some embodiments, the invention constitutes a self-contained module able to "plug in"to existing fuze systems and provide the apogee detection information or other projectile dynamic state and orientation information required to meet mission requirements. (At minimum, such information will consist of a simple electrical pulse indicating that apogee has occurred. In other instances, the information may consist of a data signal indicative of time to apogee. In still other instances, the information will consist of more complete projectile dynamic state information as computed by the module, including, for example, computed attitude and/or angular rates and/or accelerations. In still other instances, the information will also include filtered or raw sensor data from the sensors within the module.) Such modular embodiments may be referred to as an "apogee detection module" (ADM). In such embodiments the invention preferably includes firmware tailored to meet the requirements of the fuze, which may include sampling rates, buffer size, or interface protocols modified from the ones described in this disclosure; such modification is within ordinary skill, given the teachings of this specification.

Preferably, the ADM system of the present invention does not rely on external environmental data in order to detect apogee. Also, preferably, the ADM system of the present invention does not rely on a priori knowledge of the projectile's dynamic state or intended trajectory in to detect apogee. By "no a priori knowledge," it is meant, among other things, that there is no need to input maximum altitude estimates or launch data, including firing angle, firing acceleration, initial estimates or measurements of barometric pressure or temperature, etc., into the ADM, and the ADM does not rely on such estimates or data for computing projectile dynamic state or for predicting or detecting apogee. Thus, for example, there is no need for ADM sensors to make pre-launch measurements of a non-accelerating state, or for the ADM to receive such information from a source external to the ADM. Likewise, there is no need for the ADM to be "pre-set" or "programmed" for each individual launch. For another example, there is no need for the ADM to "know" that the projectile is sitting at a 45-degree pitch angle prior to firing or launch, and thus no need for the ADM to sense or be fed such measurements or data. Instead, the ADM is capable of relying only on measurements made by its own internal sensors and to begin doing so while the projectile is already in flight.

By "not relying on external environmental data," it is meant, among other things, that the ADM need not receive or rely upon signals or sensor measurements external to the ADM, but that the ADM may rely instead on only signals from those sensors built into and forming part of the ADM, and furthermore, that the ADM need not make any external environmental measurement, including of barometric pressure, and thus, that the ADM may be entirely self-contained and totally closed-off from the external environment, aside from the provision of whatever electrical connector(s) may be needed to supply electrical power to the ADM and/or to transmit signals or data from the ADM to the fuze or other projectile component(s). Although, in some embodiments, it is not required that the ADM be entirely self-contained and closed off in a modular casing, the below description of the invention will permit for such self-contained, closed-off embodiments and thus will provide the features and advantages that inhere to such self-contained, closed-off systems, such as the protection from external damage and the easy, inexpensive, and convenient assembly and replaceability that results from modularity.

Preferably, the ADM system of the present invention is modular. By "modular," it is meant, among other things, that (1) the ADM is constructed as a single package, which may or may not be entirely enclosed, but preferably is encased and enclosed so as to keep out dirt, liquids, and debris and to eliminate or minimize the possibility of damage while handling, and (2) the modular ADM can be easily installed, removed, and replaced with a minimum of connections and disconnections, and that the form factor of the ADM is standardized from one ADM to another of the same type such that a faulty ADM may be easily swapped out with another of the same type without the need to redesign or reconfigure the larger system that the ADM is installed in. Connections between the ADM and the larger system into which it is installed may be purely structural, purely functional, or both. By "structural connection" it is meant that the connection secures the ADM in place with respect to the larger system, while by "functional connection" it is meant that the physical connection supplies electrical power or data to the ADM or is used to transmit data to the ADM. Screws, bolts, snaps, pegs/slots, and other similar fittings are examples of structural connections, while electrical connectors, including those with male-female mating pins or prongs, are examples of functional connectors. Properly designed, connections may be both structural and functional, as when electrical connectors fit to secure the ADM into place. With respect to the number of disconnections and connections, preferably, the ADM installs with four or fewer screws or bolts or other structural connectors. More preferably, three or fewer screws or bolts or other structural connectors are used. Still more preferably, two or fewer screws or bolts or other structural connectors are used. Even more preferably, only one screw, bolt, or other structural connector is used. Most preferably, no screws or bolts or similar connectors are needed and the ADM fits snugly into a space designed to receive it. Preferably, three or fewer functional connectors are needed to connect the modular ADM to the larger system in which it is installed. More preferably, two or fewer functional connectors are used. More preferably still, only one functional connector is used. In some embodiments, the ADM may rely on wireless transmission for data and/or power such that no functional connector need be disconnected or connected when installing or replacing the ADM; however, such an embodiment is not necessarily preferable as it may make the ADM and the structures needed to support it unduly complicated and costly.

The ADM may be installed into a mortar fuze, the body of a rocket or missile, or any other suitable part of a projectile. The larger system into which the ADM is installed generally will be designed to withstand the high g forces of firing, launch, and possibly impact. Preferably, the installed ADM is secure and immobile with respect to the other components of the system into which it is installed so as to prevent the ADM from being moved during high-acceleration events which could cause the ADM to damage itself or other components of the system into which it is installed. This immobilization can be accomplished by securing the ADM with screws, bolds, or other suitable structural connectors known in the art, by gluing the ADM in place using a suitable adhesive known in the art, and/or by inserting the ADM into a compartment or slot built no larger than the ADM such that the ADM sits snugly when installed, possibly after sliding into place along mating tracks. Other methods or means known in the art for this purpose may also be used. Also preferably, within the ADM, the components of the ADM are well potted and secured to ensure survivability of the ADM during high-g events.

In accordance with the preferred embodiments of the ADM of the present invention, preferably, a minimum of sensors are used for detection of apogee. Preferably, however, all three of an accelerometer, magnetometer and gyroscope are used. Fewer sensors may yield a workable result in some applications, but generally use of all three listed types of sensors is preferred for accuracy in the types of projectiles in which the ADM of the present invention is to be used. This is because a module consisting of only accelerometer and gyroscope data will lose its absolute orientation as the gyro drifts over time. This drift will be magnified as the data passes through filtering routines, and errors in excess of 10% could be incurred from the apogee detection algorithm. A module consisting of an accelerometer and magnetometer is vulnerable to data corruption and modeling uncertainties due to the presence of ferrous material in the environment. By including all three of an accelerometer, magnetometer, and gyroscope, the ADM eliminates the drift and hard erroneous offsets that occur with stand-alone sensor solutions. Algorithms for detecting apogee, as described below, are able to compensate for any error that inherently accumulates in each sensor, such as hard/soft metal offsets to magnetometers, or drift in the gyroscopes. An algorithm that integrates data from all three sensors thus maintains highly accurate apogee solutions, regardless of environment.

To detect apogee, the sensors provide data at a defined sampling rate that is suitable for the non-spinning or low spinning mortars, 200 Hz being the minimum. Uses of higher sampling rates is generally preferable, but sampling rates are bounded by memory write bottlenecks and data processing bottlenecks within the ADM processor. When the processor is selected as mentioned in this disclosure, then preferably, the overall sampling rate for the sensors is selected to be on the order of tens of kilohertz so as to ensure real-time operation. The sampled data is filtered and converted to the correct reference frame, and transmitted to the fuze to allow for arming and detonation, or to other projectile systems or subsystems to signal the initiation or timing of other projectile functions such as maneuvering, targeting, morphing, state transitioning, etc., as discussed elsewhere in this disclosure.

The ADM preferably takes the form of a standalone circuit that includes two major electronic components—the sensor suite and the microprocessor—as well as provides for algorithms, as disclosed herein, for filtering and detection of apogee. These algorithms are preferably implemented as firmware on the microprocessor.

As discussed previously, during the projectile's ballistic flight, apogee is reached when the projectile reaches its highest altitude. At this point, the vertical velocity falls to zero, the nose turns over and the pitch angle (inertial frame) approaches zero. The attitude of the projectile then becomes negative, and descends to the target. The presence of aerodynamic drag allows for noticeable changes in the linear acceleration of the projectile to assist in the indication of apogee. Linear drag follows a similar parabolic shape as the trajectory, and reaches a point of inflection where the curvature of the acceleration curve changes sign.

FIG. 1 illustrates the typical ballistic trajectory of a projectile 11, and how the components of velocity and attitude change with time. Although the projectile of interest could be a self-propelled projectile such as a rocket or missile, and the ADM of the present invention would work just as well, a mortar 11 is shown as exemplary. With a mortar, typically, all of the charge is expended upon firing and the greatest acceleration is experienced at firing. During ballistic flight of the projectile 11, which may be fired from a gun 12 or launched by other known means, apogee 13 is reached when the projectile reaches its highest altitude. At this point, the vertical velocity, denoted $v_y$ in FIG. 1, falls to zero, the nose turns over, and the pitch angle (inertial frame) approaches zero. The attitude of the projectile then becomes negative, and the projectile descends to the target 14. The presence of aerodynamic drag allows for noticeable changes in the linear acceleration of the projectile to assist in the indication of apogee. Linear drag follows a similar parabolic shape as the trajectory, and reaches a point of inflection, where the curvature of the acceleration curve changes sign.

Figure 2:
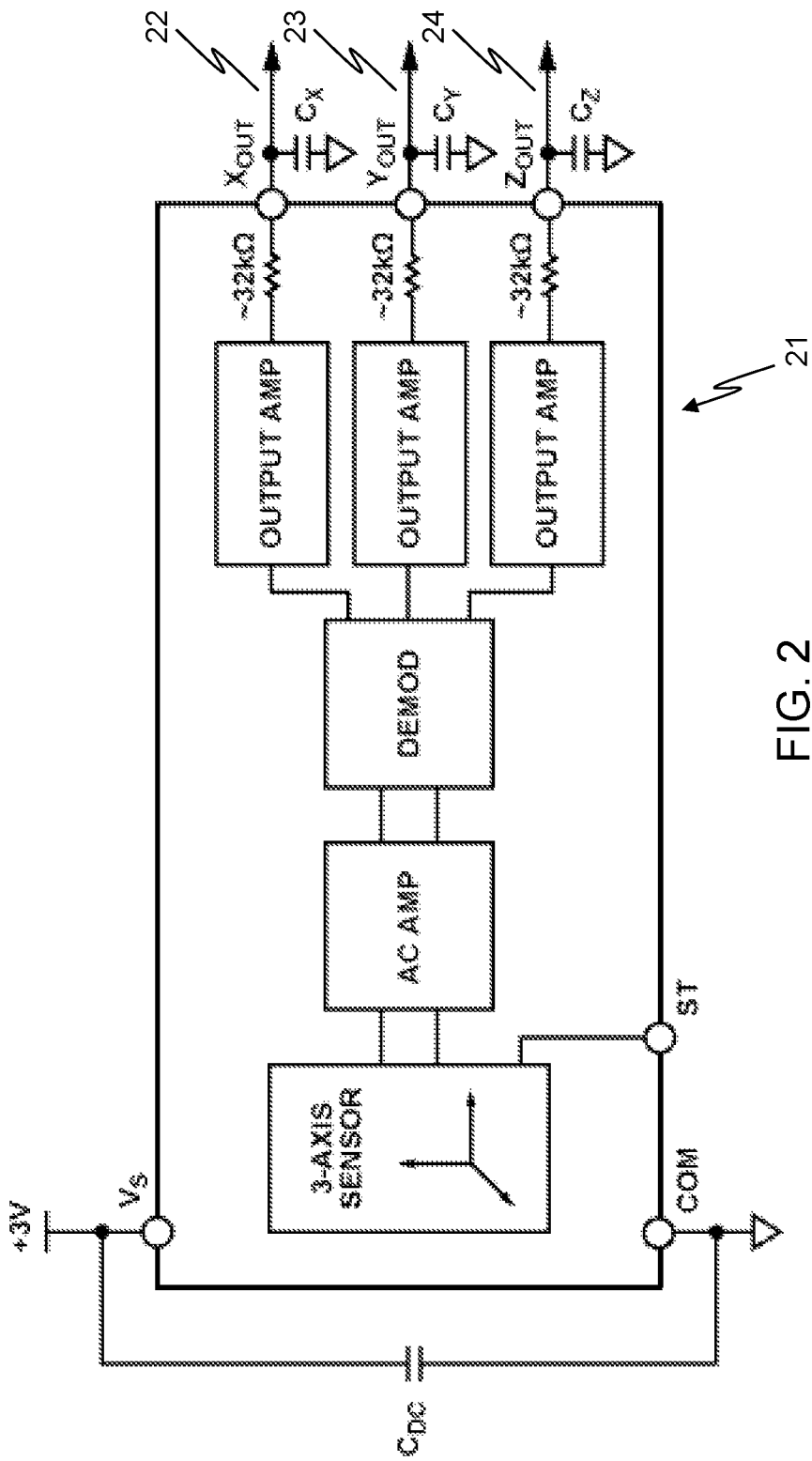
FIG. 2. Functional block diagram for an accelerometer.

In preferred embodiments, the ADM includes three sensors and utilizes two main parameters to detect when the projectile crosses apogee. The first parameter is based on the linear aerodynamic drag and acceleration readings obtained from the accelerometer 21, as shown in functional block diagram form in FIG. 2. FIG. 2A also shows the accelerometer 21 preferably included in the ADM to provide sensor data that describes the aerodynamic drag or axial forces sensed on the projectile during flight. In the body-fixed reference frame, the axial accelerometer is used to detect the drag on the projectile. In ballistic flight, a combination of gravitational and aerodynamic forces are acting on the projectile in both the vertical and horizontal axes. Any suitable accelerometer known in the art may be used, but preferably, the accelerometer is a MEMS accelerometer. An example of a suitable or preferred accelerometer is the ADXL326, as shown in FIGS. 2 and 2A. The accelerometer shown is a small, low power 3-axis accelerometer with three signal-conditioned voltage outputs 22, 23, 24 provided to sense acceleration in three directions of motion. Preferably, the chosen accelerometer 21 is tunable to measure acceleration within minimum full-scale ranges of ±5 g or ±16 g, depending on resolution requirements. It preferably fits in a low-profile 4 mm×4 mm×1.45 mm package or smaller.

The open-loop acceleration measurement architecture of the present invention is preferably implemented as polysilicon surface-micromachined sensor and signal conditioning circuitry. The output signals are analog voltages that are proportional to acceleration. The data is processed and converted in real-time to engineering units (g's) by the firmware installed on the microprocessor.

Figure 3:
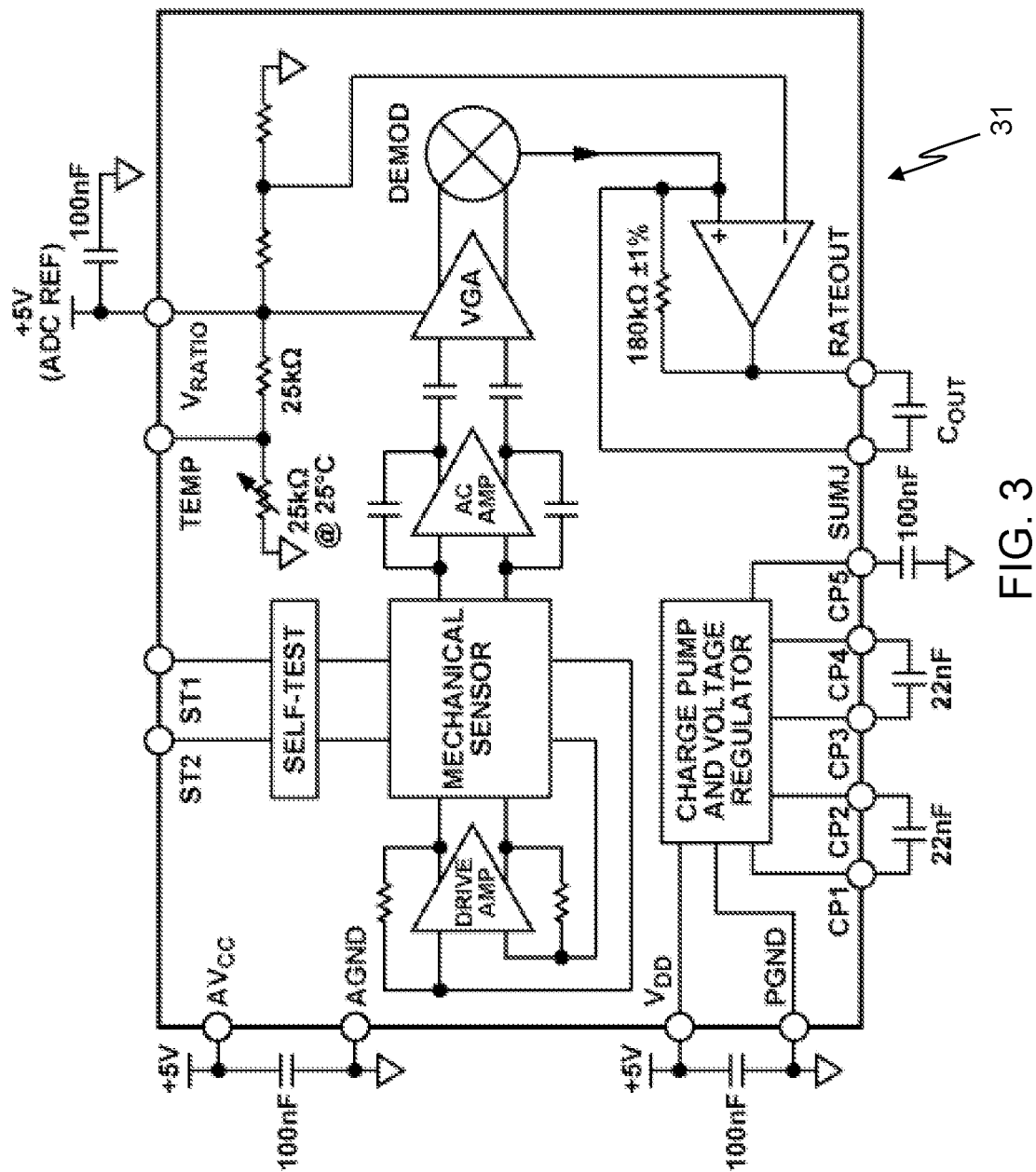
FIG. 3. Functional block diagram for a gyroscope.

To provide attitude information for the ADM, a gyroscope 31 is preferably integrated into the circuit (FIGS. 3 and 3C). Any suitable gyroscope known in the art may be used, but preferably, the gyroscope is a MEMS gyroscope. An example of a suitable or preferred gyroscope is the ADXRS620, as shown in FIGS. 3, 3A, and 3C, which has an output voltage proportional to the angular rate about the axis normal to the top surface of the integrated circuit (IC) package. As shown in FIGS. 3A, 3B, and 3C, preferably, three gyroscopes 31a, 31b, and 31c are used, each orthogonal to the others, so that all three of pitch, yaw, and roll angular rates may be measured, respectively. More preferably, the ADXRS649 gyroscope 31c is used at least for sensing roll. The angular rate sensor should be selected to be capable of measuring ranges to ±50,000°/sec (~140 Hz), but have an adjustable threshold to allow for higher fidelity measurements at lower rates. The differential quad sensor design of the selected gyroscopes advantageously rejects the influence of linear acceleration, allowing for robust data collection in harsh, high-g environments.

The selected gyroscope preferably has low power consumption, preferably 3.5 mA or less, and fast startup times, preferably less than 3 ms, allowing the ADM of the present invention to quickly cycle power to the circuit and enter apogee-detection protocols. In addition, the selected gyroscope sensor preferably follows the reduced size, weight, and power (SWaP) design process, preferably by fitting into a 7 mm×7 mm×3 mm ceramic ball grid arrays (CBGA) package or smaller.

Figure 4:
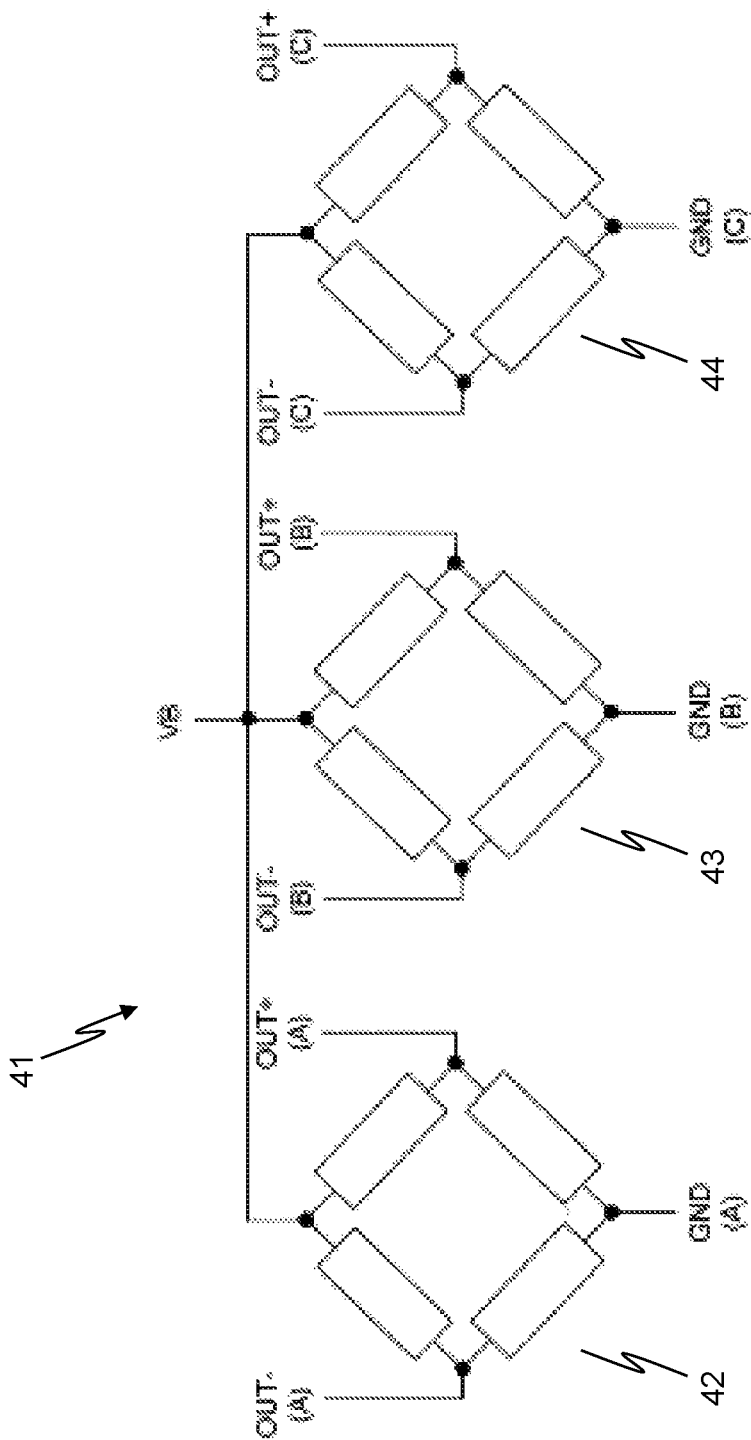
FIG. 4. Magnetometer notional schematic.

Preferably, the ADM also includes a magnetometer 41 (FIGS. 4 and 4A). As with the previously-described sensors, any suitable magnetometer known in the art may be used, but preferably the selected magnetometer is no larger than 3.0 mm×3.0 mm×0.9 mm and preferably has a resolution of 5 milligauss. More preferably, the sensor has a resolution of 120 μgauss, allowing for more accurate detection of the Earth's magnetic field. Furthermore, the selected magnetometer preferably has a higher bandwidth (at least 5 MHz), and is capable of being sampled much faster than other commercial off-the-shelf (COTS) devices of the same family, enabling the ADM to sample at very high rates, not limited by any of the sensors. An example of a suitable magnetometer is the HMC5883 shown in FIG. 4A. The data from the magnetometer 41 is combined (or "fused") with the rate sensor data to provide precise attitude determination computations in body-fixed and inertial frames.

FIG. 4 illustrates the basic functionality of the magnetometer 41. The sensor 41 is composed of Wheatstone bridge devices 42, 43, 44 to measure the magnetic field in the desired axis. When power is supplied to a bridge, the sensor 41 converts the incident magnetic field in the sensing axis to a voltage differential output. The magnetoresistive sensors are made of nickel-iron thin-film deposited on silicon wafer, patterned as a resistive strip element. The voltage differential is passed through the Kalman filter apogee detection algorithm of the present invention, and converted to the required engineering units in the process.

Figure 5:
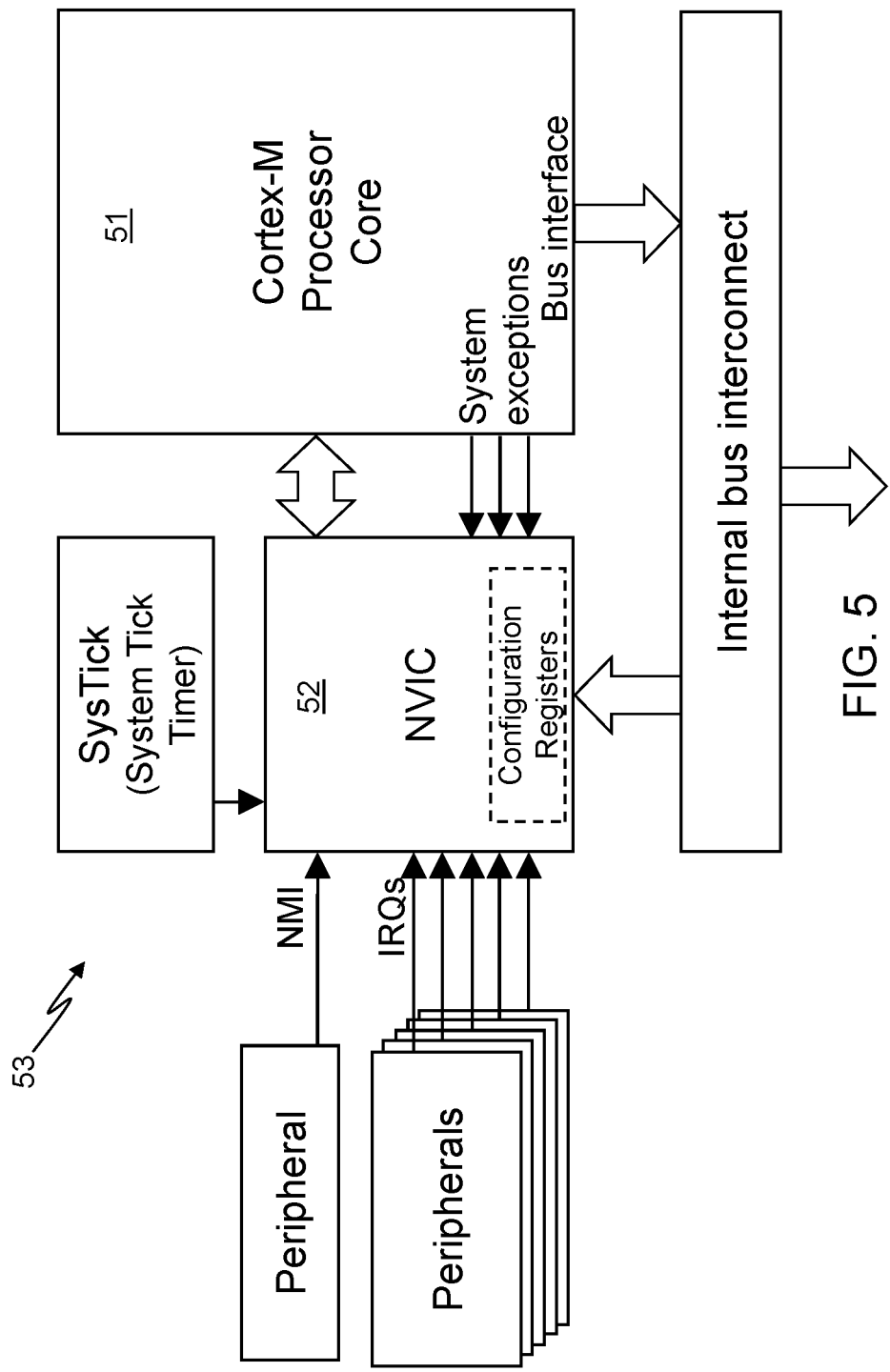
FIG. 5. Overview of Cortex-M communication architecture.
Figure 5A:
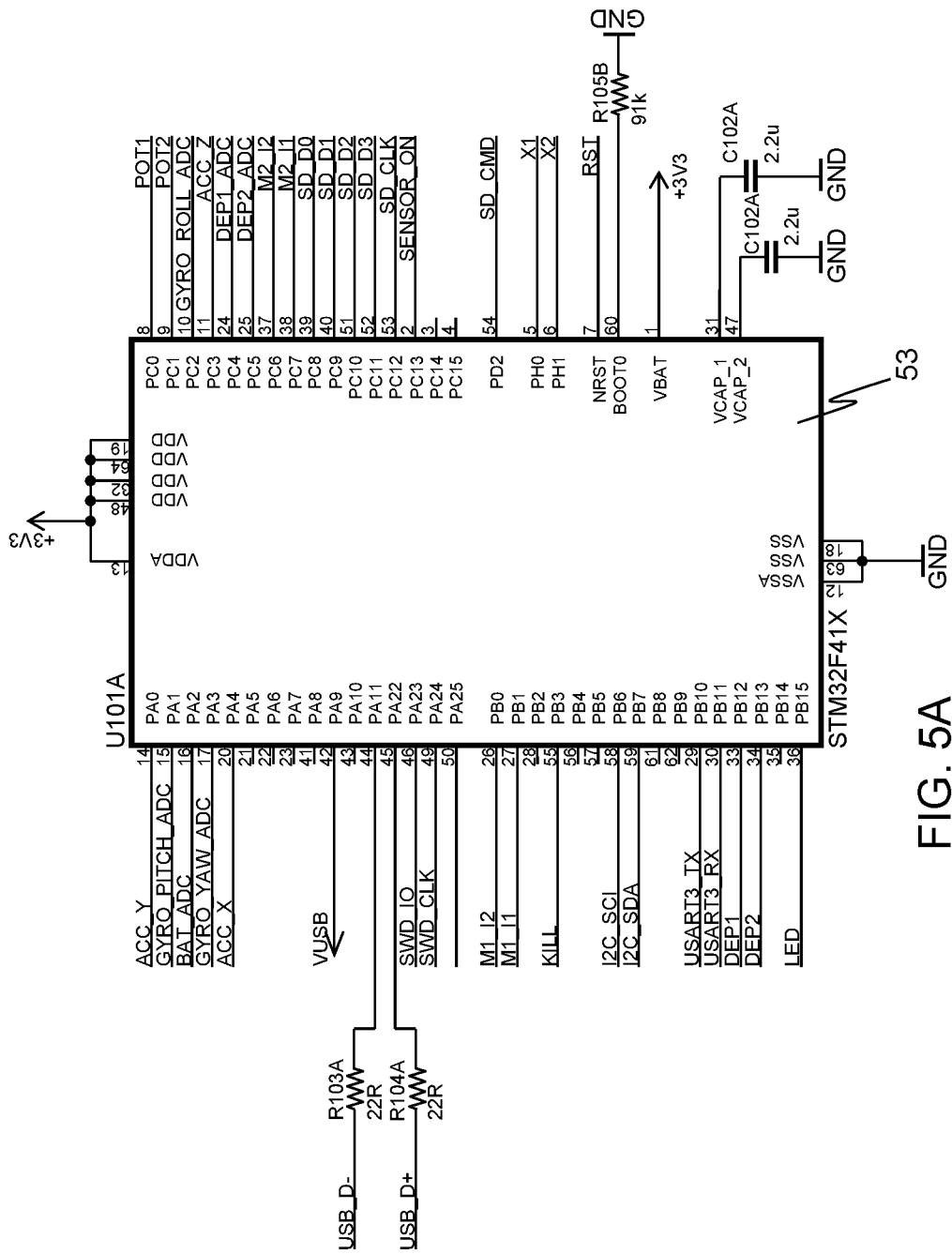
FIG. 5A. Schematic block diagram of a processor.

As shown in FIGS. 5 and 5A, the microprocessor 53 used for the ADM may be any known in the art meeting the specifications for speed, power usage, package size and form factor, and so forth. For example—and, in some embodiments, preferably—a suitable microprocessor may be selected from the Cortex-M family of ARM processors. The ARM processor can provide efficient control and signal processing across a wide range of applications. In particular, the Cortex-M4 processor may be selected. Such a processor may be optimized for the processing requirements of the ADM of the present invention for fuze applications or other applications as described herein. The ARM Cortex Microcontroller Software Interface Standard (CMSIS) may be used to create, modify and/or upgrade software for interfacing with peripherals, real-time operating systems, and middleware.

Key to the performance of this family of MCUs is the built-in Nested Vectored Interrupt Controller (NVIC) 52, which provides interrupt handling, queing and tasking capabilities. This process is depicted schematically in FIG. 5, showing the functional relationship between NVIC 52 and the core 51 of the processor 53. It is generally required that only 92% of a processor's cycles be consumed by computational tasks, in order to leave 8% for processing overhead. Inefficiency in the algorithm design—or an over-ambitious sensor-sampling and computation scheme—that results in consuming more than 92% may endanger the system by depriving the microprocessor of sufficient free processing cycles for overhead tasks to be performed. However, by placing sensor reads in interrupts rather than having them be actual computational tasks, up to 98% processor capacity may be used directly for ADM processes, permitting for real-time in-flight operation of the Kalman filter and thus real-time apogee prediction.

The ADM may make use of other sensors (not shown), including but not limited to air pressure sensors, GPS antennas/sensors, video sensors, IR/heat/horizon sensors (short wave/medium wave/long wave), radar sensors, lidar sensors, sonic sensors/microphones, and others known in the art to be useful in projectile applications. Generally, however, the limitation of sensors to the fewest number possible is preferable, and the use of additional sensors beyond the accelerometer, gyroscope, and magnetometer already mentioned is not preferable because other sensors may have too-high power requirements or processing requirements, and/or use of such sensors may have any the disadvantages already discussed. Additional sensors may mean high computational overhead which will significantly degrade the performance of the overall system. Nevertheless, related embodiments may make use of these additional sensors for the detection and/or prediction of apogee, and in some cases may substitute for the accelerometer, gyroscope, and/or magnetometer so as to fulfill similar error-correction functions and provide for accurate detection of pitch angle or other apogee-indicative parameters.

Power may be supplied to the ADM of the present invention either by a battery internal to the ADM or, in some embodiments more preferably, by a connection to an outside power source. This connection may be wired (as by a simple conductive electrical connection) or wireless (as by an inductive transmission of power). Whether electrical power is supplied by a battery or an external source, it may be required that the ADM of the present invention also contain the requisite power supply circuitry to appropriately condition the power supplied to the sensors, microprocessor, and other parts of the ADM. The design of such power supply circuitry is within the ordinary level of skill and any known, suitable design may be selected and implemented. Connection to an outside power source capable of supplying power of the needed voltages can simplify (or obviate as unnecessary) the power supply design in any ADM-internal electrical power supply. The provision of appropriately conditioned outside power to the ADM from, for example, the projectile fuze further facilitates the miniaturization of the ADM. Preferably, the ADM of the present invention is no larger than about 25 mm×25 mm×3.5 mm. More preferably the ADM of the present invention has a thickness of no more than 1.75 mm, making it about the size of a U.S. quarter-dollar coin.

The preferred ADM sensor suite of accelerometer, gyroscope, magnetometer provides the data necessary to estimate and detect the ballistic apogee of a projectile. To perform these calculations, algorithms for computing the attitude and orientation of the round are implemented and, preferably, a Kalman filter is used to extract precise estimates of apogee from inherently noisy sensor inputs.

Figure 6:
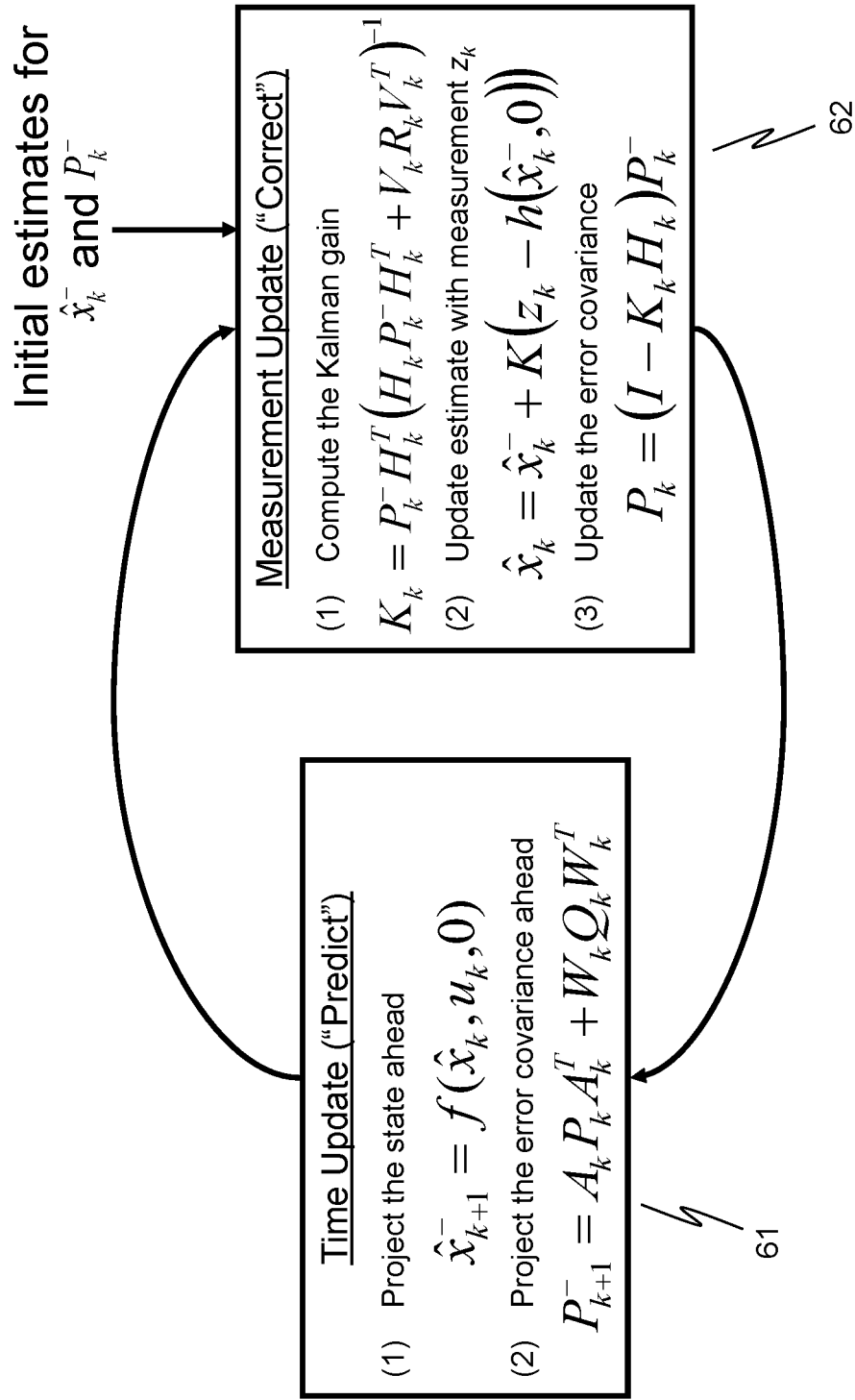
FIG. 6. Outline of an extended Kalman filter processing loop.

As shown in FIG. 6, the underlying Kalman filter algorithm works in a two-step process. First, a prediction step 61 estimates current state variables, including uncertainties in each parameter. An update step 62 then uses a weighted average to update the prior states, giving more weight to those parameters with higher certainty. These weights are measured from the covariance, or measure of uncertainty of the state's prediction. This recursive nature of the filter requires only the latest estimate, rather than an entire time history, enabling quicker convergence and faster computations.

For non-linear systems, such as those for flight dynamics, the extended Kalman filter (EKF) is preferably implemented. This non-linear version of the Kalman filter linearizes the solution about an estimate of the current mean and covariance. To avoid the singularity in trigonometric calculations involving Euler angles, intermediate calculations are preferably done using quaternions. Therefore, the filter preferably employed in the ADM of the present invention is what is known as a quaternion extended Kalman filter (QEKF). The mathematical function of the preferred QEKF of the present invention will not be described in detail. A person skilled in the art could implement the filter in firmware or software run by the disclosed microprocessor given the below disclosure. Importantly, the algorithm described is fast enough to be implemented in real-time on board a launched projectile. It is not useful merely for simulations that can be performed on desktop computers that need not be run in real time. The speed of the algorithm is critical for mission applications as described in this disclosure.

Figure 7:
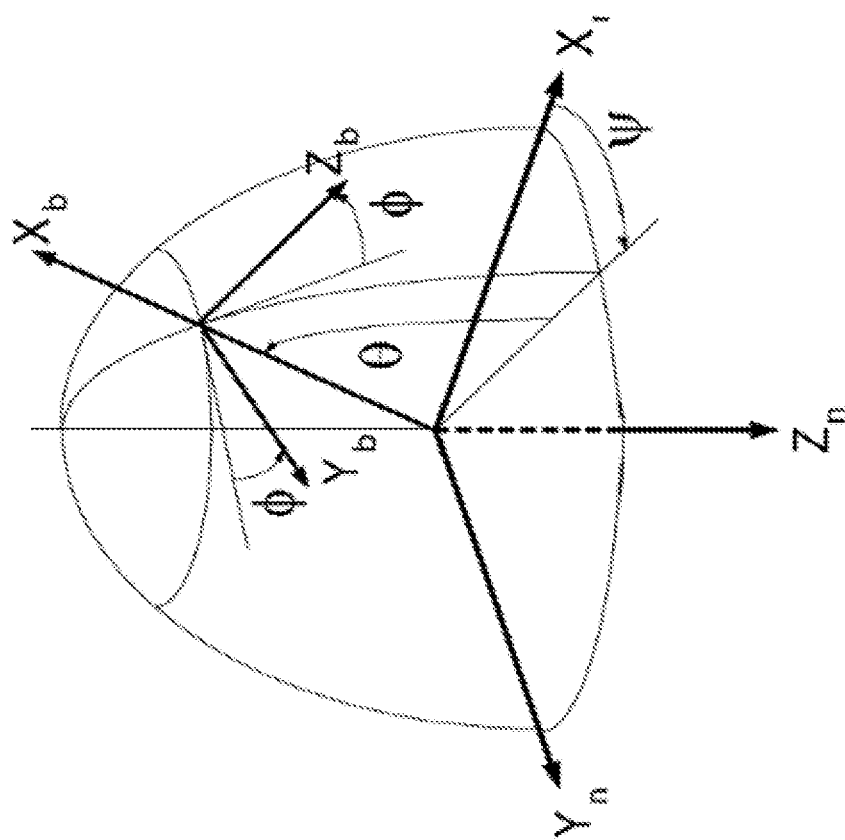
FIG. 7. Coordinate system for a quaternion extended Kalman filter.

FIG. 7 depicts the two coordinate frames used in the QEKF: body frame (using b subscripts in the variable names) and navigation frame (using n subscripts). The body frame originates at the center of gravity of the gyroscope, with each axis pointing along the gyroscope axis. The navigation frame is the classical navigation frame, pointing north, east, up. The quaternion $q=(q_0 q_1 q_2 q_3)$ represents the orientation quaternion in the navigation frame, including the axis of rotation and a vector representation of orientation. The relationship between an arbitrary vector in the body frame $p_b$ and an arbitrary vector in the navigation frame $p_n$ is then as follows:

$$P_b = C(q) p_n$$

With C(q) as the rotation matrix defined using the right-handed notation as:

$2q_0^2 + q_1^2 - 1 \quad 2q_1 q_2 + 2q_0 q_3 \quad 2q_1 q_3 - 2q_0 q_2$ $2q_1 q_2 - 2q_0 q_3 \quad 2q_0^2 + q_2^2 - 1 \quad 2q_2 q_3 + 2q_0 q_1$ $2q_1 q_3 + 2q_0 q_2 \quad 2q_2 q_3 - 2q_0 q_1 \quad 2q_0^2 + q_3^2 - 1$ The objective of the QEKF of the present invention is to solve for q, which can then easily be converted to Euler angles and used to detect apogee. The QEKF uses the available sensor outputs to estimate q. The accelerometer, gyroscope, and magnetometer outputs are respectively given by:

$$y_a = C(q)\bar{g} + b_a + v_a + a_b$$

$$y_g = \omega + b_g + v_g$$

$$y_m = C(q)\bar{m} + v_m$$

In the equations for the sensor outputs, g represents the gravitational constant and m represents the magnetic inclination, the angle made with the horizontal by Earth's local magnetic field lines. $(v_a\ v_g\ v_m)$ are the noise components to each sensor, and have been shown characteristic zero mean white Gaussian noise. Biases for each sensor are characterized in $(b_a\ b_g\ b_m)$, while $a_b$ includes the external accelerations of the system. Note that $b_m$ is insignificant because the magnetometer will not have a bias.

The Kalman filter begins by estimating a quaternion from the derivative equation:

$$\frac{d\hat{q}}{dt} = \frac{1}{2}\hat{q} \otimes y_g$$

With the knowledge that $\hat{q}$ contains orientation errors, either from noise and/or bias, perturbation theory can be applied to attempt to linearize toward a solution:

$$q = \hat{q} \otimes \tilde{q}_e$$

The error will be representative of both the noise and bias of the gyroscope, and will not have any dependency on the angular rate, so that $\tilde{q}_e$ remains a small value independent of the rotational rates present. This will allow for the algorithm to remain accurate in the cases where a projectile becomes unstable, whether through flight disturbances or countermeasures. Using indirect methods for estimating q, the error estimation is approximated by:

$$\dot{q}_e = -y_g \times q_e - \frac{1}{2(b_g + v_g)}$$

This leads to a definition for the current state as:

$$x = \begin{bmatrix} q_e \\ b_g \\ v_g \end{bmatrix}$$

So that the process equation for the QEKF is given of the form:

$$x(t) = A\dot{x}(t) + \begin{bmatrix} -0.5 v_g \\ v_{b_g} \\ v_{b_a} \end{bmatrix}$$

The measurement step relies on the sensor data to provide the next step in the QEKF process. The measurement equation follows the same perturbation method, assuming small errors from biases and noise:

$$C(q) = CC(\hat{q})$$

The rotation matrices follow right handed notation, where $c(\bar{q}_e)$ is skew-symmetric and is given ignoring high-order terms:

$$C(\bar{q}_e) = \begin{bmatrix} 1 & 2q_{e,2} & -2q_{e,2} \\ -2q_{e,2} & 1 & 2q_{e,2} \\ 2q_{e,2} & -2q_{e,1} & 1 \end{bmatrix}$$

Using the fact that the cross-product is anti-commutative (anti-symmetric), the measurements for the accelerometer and magnetometer are given:

$$y_a - C(\hat{q})\bar{g} = 2[C(\hat{q})\bar{g}] \times q_e + b_a + v_a + a_b$$

$$y_m - C(\hat{q})\bar{m} = 2[C(\hat{q})\bar{m}] \times q_e + v_m$$

These equations act as the system model for the filter, with the above two equations as input measurements including noise/bias to the QEKF. For the microprocessor to process this algorithm it is discretized in the following manner:

$$x_{k+1} = \varphi_k x_k + \omega_k$$

This represents the standard discretized process equation including process noise function. The state transition matrix φ is defined in standard form as:

$$\varphi_k \equiv e^{AT}$$

Where the following restriction must hold:

$$\varphi[k_0, k_0] = I$$

I being the identity matrix.

The discrete system model and measurement model are then given by:

$$x_{k+1} = f(x_k, k) + w_k, \quad w(t) \to N(0, Q_k)$$

$$z_k = h(x_k) + v_k, \quad v_k \to N(0, R_k)$$

Q and R are covariance matrices empirically calculated based on the performance and sensitivity of the sensors and behave as positive definite matrices. From these equations the prediction and update steps for the discrete QEKF are given below:

$$P_{k+1}^- = A_k P_k A_k^T + W_k Q W_k^T \quad \text{(Error covariance prediction)}$$

$$K_k = P_k^- H_k^T (H_k P_k^- H_k^T + V_k R_k V_k^T)^{-1} \quad \text{(Kalman gain)}$$

$$\hat{x}_k = \hat{x}_x^- + K(z_k - h\{\hat{x}_x^- 0\}) \quad \text{(Estimate update via measurement step)}$$

$$P_k = (I - K_k H_k) P_k^- \quad \text{(Error covariance update)}$$

From the Kalman solution, quaternion integration can be performed using a discrete approximation (3rd order linearization). This leads to the quaternion solution:

$$q_{k+1} = \left(I + \frac{3}{4}\Omega_k T - \frac{1}{4}\Omega_{k-1}T - \frac{1}{6}\|\omega_k\|_2^2 T^2 - \frac{1}{24}\Omega_k \Omega_{k-1} T^2 - \frac{1}{48}\|\omega_k\|_2^2 \Omega_k T^3\right) q_k$$

Normalization of the quaternion constrains the value of the prediction step for the following computations. To return to Euler angles, the quaternion solution is converted through the use of the following trigonometric relationships:

$$\varphi = \arctan\left(\frac{2(q_0 q_1 + q_2 q_3)}{1 - 2(q_2^2 + q_3^2)}\right)$$

$$\theta = \arcsin(2 q_0 q_2 + q_3 q_1)$$

$$\psi = \arctan\left(\frac{2(q_0 q_3 + q_1 + q_2)}{1 - 2(q_2^2 + q_3^2)}\right)$$

Rotation from body to navigation coordinate systems is performed on the angular values to provide apogee data in the required reference frame. This direction cosine matrix takes the form:

| $\cos(\psi)\cos(\theta)$ | $\sin(\psi)\cos(\theta)$ | $-\sin(\theta)$ |
|---|---|---|
| $(\cos(\psi)\sin(\theta)\sin(\varphi) - \sin(\psi)\cos(\varphi))$ | $(\sin(\psi)\sin(\theta)\sin(\varphi) + \cos(\psi)\cos(\varphi))$ | $\cos(\theta)\sin(\varphi)$ |
| $(\cos(\psi)\sin(\theta)\cos(\varphi) + \sin(\psi)\sin(\varphi))$ | $(\sin(\psi)\sin(\theta)\cos(\varphi) - \cos(\psi)\sin(\varphi))$ | $\cos(\theta)\sin(\varphi)$ |

While some embodiments of the present invention consist of the ADM of the present invention alone, other embodiments of the invention consist of projectiles having the ADM of the present invention, whether modular or not. In projectile embodiments, the ADM may supply some data or signal which informs the other system(s) of the projectile and/or triggers some flight event such as airframe reconfiguration such as body morphing or shedding of control surfaces, arming of a weapon, activation of a targeting system, sensor system, or other power-consumptive system, initiation of a maneuver, firing of a propulsion system, etc.

One exemplary embodiment consists of the ADM installed in a mortar having a fuze which should not be armed for detonation until some time after apogee. When apogee is detected or predicted by the ADM of the present invention according to the scheme described above, the ADM transmits a signal to the fuze and the fuze arms the weapon appropriately. Another exemplary embodiment consists of the ADM installed in a guided 120 mm mortar, where the round has deployable control surfaces to reduce the (low) spin rate, self-right the round and maneuver for extended range and terminal guidance. Upon prediction or detection of apogee, the ADM transmits a signal to a control surface controller, thereby activating the control surface system to deploy and actuate the deployable control surfaces, in appropriate instances just before a predicted apogee, in order to glide and/or steer the mortar, thus both extending the range and improving the precision of the mortar beyond what would be achievable with ballistic flight alone, or even steerable ballistic flight alone. Yet another exemplary embodiment consists of the ADM installed in a fired projectile having an auxiliary rocket motor used for range extension or for optional maneuvering/acceleration to confuse or evade countermeasures, avoid unanticipated obstacles, etc., where the rocket motor should not be activated until after apogee. In such an embodiment, the ADM transmits a signal indicative of the detection or prediction of apogee to timely initiate the firing of the rocket motor; this signal may be transmitted at, after, or even before apogee. Still another exemplary embodiment consists of the ADM installed in a projectile having a flight control, steering, or targeting system that should not be or need not be activated until the appropriate moment related to apogee. Such a moment may be at, after, or before apogee, but in any case is related to apogee by some definite amount of time. In such an embodiment, the ADM of the present invention supplies the relevant information or triggering signal to aid or initiate the relevant projectile system processes. For example, a targeting system may involve instantaneous wireless transmission of targeting data, including video data from a video camera mounted in the nose of the projectile, from the projectile back to an observer located near the target, the firer at the point of launch, or an overseer at a home base. Such sensing, computing, and wireless transmission, performed on-board and in-flight, may be highly power consumptive, and in some instances it will be preferable that the targeting sensing, computing, and/or wireless transmission systems not be activated until absolutely necessary, at some point in time at or related to apogee. In such a case, the ADM of the present invention, implemented into such a projectile, can effectively and advantageously delay the activation of such systems and the power-consumptive transmission of targeting data until the appropriate time.

Numerous related or similar embodiments are envisioned. For example, the ADM of the present invention may be used to supply the appropriate apogee-related information to effect the needed change or subsystem initiation or activation when incorporated into: the missile or projectile of U.S. Pat. Nos. 7,709,772, 7,880,125, or 8,367,992 (describing control surfaces shed during flight to provide rapid changes in stability/maneuverability of a projectile and/or to rapidly maneuver a projectile, particularly as part of a targeting or avoidance scheme); the missile or projectile of U.S. Pat. No. 8,809,755 (describing control surfaces moved along a track on the body of a missile or projectile to provide rapid changes in the stability/maneuverability of a projectile and/or to rapidly maneuver a projectile, particularly as part of a targeting or avoidance scheme); the projectile of U.S. patent application Ser. No. 13/185,508 (describing a weaponized delivery projectile that deploys a micro air vehicle at the appropriate time mid-flight as a post-operation damage assessment, investigation, and surveillance tool, where the delivery projectile also contains a weapon that proceeds to a target after deploying the micro air vehicle); the projectile of U.S. Pat. Nos. 6,685,143, 7,070,144, 7,226,015, 7,977,615, and 8,191,833 (variously describing a projectile having an afterbody or forebody flow control system that uses deployable flow effectors to affect maneuverability/stability); the projectile of U.S. patent application Ser. No. 12/942,995 (describing a projectile having a flight control actuation system consisting of rotating disc-shaped spoilers); or the projectile of U.S. patent application No. 13/769,560 (describing a high-g projectile having deployable control surfaces such as canards and/or wings for enhanced range and/or precision, and in particular self-righting dihedral wings). All of the above-listed disclosures are incorporated by reference into the present disclosure. In any of the projectiles taught in the listed disclosures, knowledge of apogee may be useful for triggering the initiation of the described deployment, transformation, or flight control processes.

In yet another embodiment, the invention is a method of reconfiguring the airframe of a ballistic projectile comprising: firing or launching a ballistic projectile having devices or systems for reconfiguring the airframe; a self-contained apogee detection module detecting or predicting the projectile's ballistic apogee by computing a ballistic trajectory estimate using a plurality of sensors each having a measurement signal associated therewith and a computer processor all within the projectile and without reference to barometric pressure; at the detected or predicted apogee or at some time related thereto, the apogee detection module transmitting a signal to the devices or systems for reconfiguring the airframe; and the devices or systems for reconfiguring the airframe then reconfiguring the airframe by extending, retracting, shedding, jettisoning, telescoping, ballooning, tracking, hinging, exploding, opening, or closing, some part of the airframe. Preferably, the sensors include at least an accelerometer, a magnetometer, and a gyroscope, but do not include a pressure sensor. Preferably, the computer processor fuses and processes the measurement signals using a quaternion extended Kalman filter to provide the ballistic trajectory estimate. Preferably, the computation is performed without any a priori knowledge of the projectile's intended ballistic trajectory. Preferably, the computer processor is operated at 98% capacity with only 2% capacity needed for overhead tasks. Preferably, no GPS is needed to make the apogee detection or prediction.

Figure 8C:
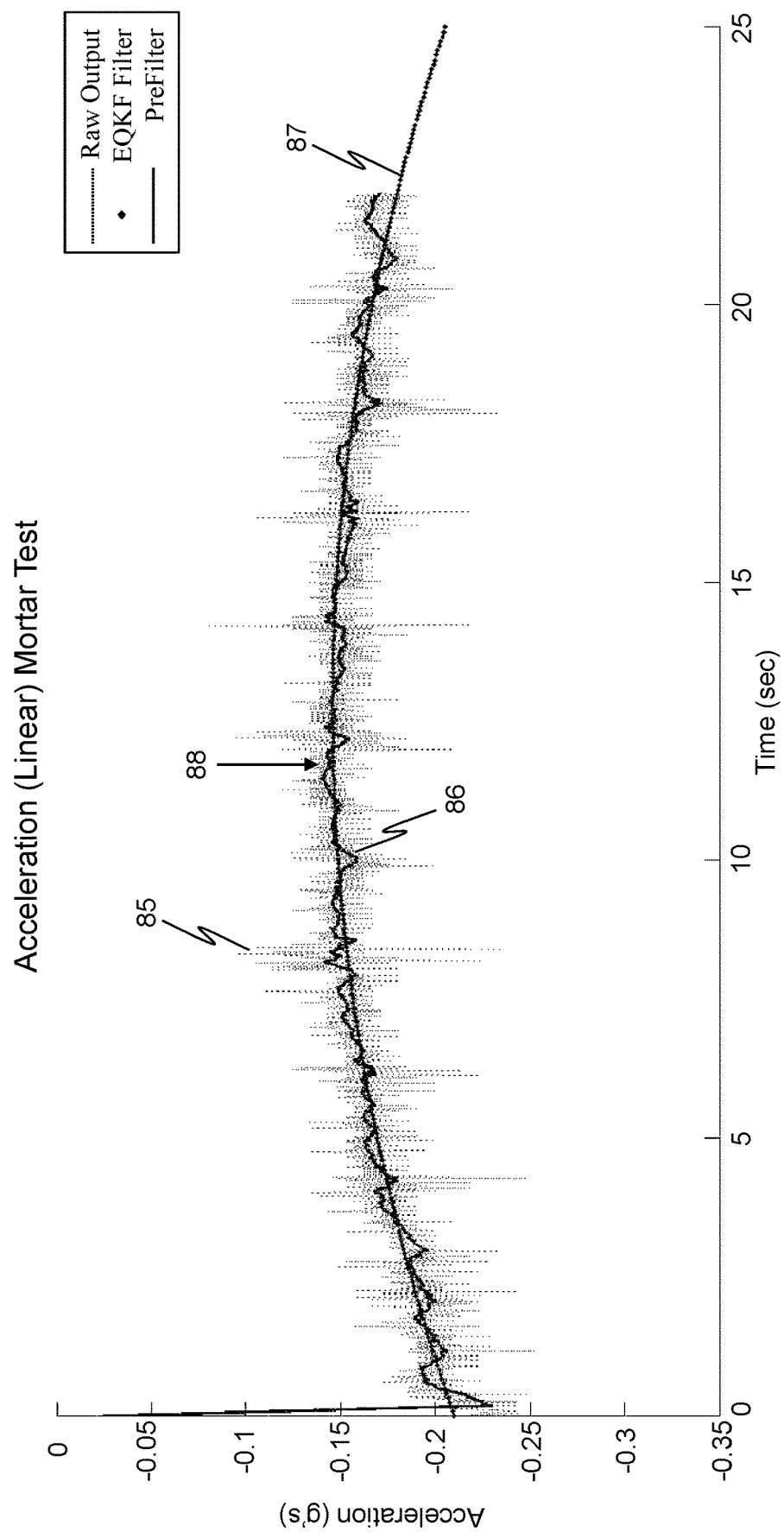
FIG. 8C. Data plot showing raw data, pre-filtered data, and Kalman filtered acceleration (in g's), with an arrow indicating the time of apogee.

The algorithm described above has been tested and validated parametrically to determine the optimal approximations allowable. From raw algorithm solutions, the filter was put through a study to include 3rd order, 7th order and 8th order terms for the Kalman filter algorithm to determine the number of terms necessary for accurate attitude estimations. For the purposes of a GNC system, precise estimation of the attitude and orientation was necessary. Test data was collected using a mission computer and sensor suite as a data recorder. This data is shown in FIGS. 8A-8C. In FIG. 8A, which shows estimated or detected pitch angle (in degrees) as a function of time (in seconds), raw sensor output 81 appears as a wavy or uncertain plot vacillating about the plot of filter output 82. Arrow 83 points to where plot 82 crosses 0 degree, and thus the estimated or predicted moment of apogee. As shown better in FIG. 8B, This plot 82 is actually four different plots showing the output of the QEKF for different filter orders—third, fourth, fifth, and sixth—but the plots sufficiently overlap as to be indistinguishable, thus demonstrating that, at least in the tested application, a third order filter is sufficient for apogee detection applications. The comparison of the QEKF using different number of high-order terms shows the limit in accuracy from inclusion of terms. Through the ADM and QEKF design, erroneous noise and biases are removed and estimation of apogee is accurately performed for use by the GNC subsystem. FIG. 8C shows acceleration in g's as a function of time with raw sensor data 85 appearing as noisy spikes about the plot of pre-filtered data 87 (filtered through a low-pass filter but before application of the QEKF) which itself vacillates about the output of the QEKF 87. The moment of detected or predicted apogee is indicated by arrow 88.

As can be seen in these plots in FIGS. 8A-8C, the parameters of the filtered data curves are established well in advance of apogee and thus apogee may be efficiently predicted seconds—or, given a long enough trajectory, minutes—before it actually occurs using known linear curve-fitting techniques which may be implemented efficiently in order to output a signal indicative of time to apogee. Alternatively or in addition, the output of the Kalman filter may be output showing curves representative of ballistic trajectory.

To account for and mitigate the accumulation of error in the ADM output solution for apogee detection, the ADM of the present invention recalibrates the sensors during flight if necessary. A set of calibration constants maintain the sensor output values within pre-determined tolerances for errors such as g-biases, scaling factors, gyroscopic drift and hard/soft metal offsets to magnetometers. These tolerances are determined through the concept-of-operations, Mil-Std, or tactical requirements for the system. Preferably, the ADM stores, in its firmware or other memory, multiple calibration values for each sensor (accelerometer, gyroscope, magnetometer, etc.) which may be pre-determined through the use of hardware-in-the-loop (HIL) testing. HIL tests put the ADM through simulated mission sequences, and these tests allow for capturing and characterizing the inherent errors in each sensor. These errors are then reduced and/or removed through further calibration of the ADM. In some embodiments, preferably, multiple calibration values for each sensor or sensor set are determined and used by the ADM to minimize errors and maintain accurate apogee solutions. The determination and storage of multiple sets of calibration constants is especially preferred when the ADM is incorporated into projectile platforms that change configuration (e.g., deploy flow effectors or otherwise morph in body shape), behave in unique or highly dynamic ways (e.g., by changing trajectory through the activation of secondary propulsion, or by using deployable or activatable flow effectors to make extreme maneuvers for targeting or collision/countermeasure avoidance), or have extended flight times where errors can accumulate and grow to unacceptable ranges. In such embodiments where multiple sets of calibration constants are pre-determined, the ADM firmware detects when a particular sensor value is out of acceptable error tolerance, and performs the re-calibration routine during flight. Mission requirements or Mil-Spec dictate the amount of allowable error, which known constant value is input into the equivalent of an if/else or case/switch loop inside the firmware. As sensor data is passed to the microprocessor, the ADM firmware checks to determine if the value is out of tolerance by comparing sensor data to the known constant allowable error, and, if sensor data does not conform to the pre-defined tolerances, performs the desired sensor recalibration. This recalibration operation is preferably handled by the microprocessor as an interrupt sequence, and preferably occurs on the order of a few microseconds. When in recalibration mode, the apogee detection algorithm of the ADM of the present invention uses the calibration constant(s) stored in the direct access memory, and the sensor under scrutiny is recalibrated to tolerance. The easy access to the calibration constants and the fast processing time of the recalibration routine does not negatively impact the speed of the overall apogee detection solution, and allows for more accurate in-flight determination of apogee.

While some embodiments of the invention help to automate the projectile targeting process by detecting or predicting apogee and then activating deployable flow control surfaces or activatable flow effectors to glide and/or steer the projectile to a target, others can help make the targeting process more human-involved by triggering the activation of guidance systems that may be too high-power to be activated prior to apogee (or some time related to apogee). The ability of a projectile to provide sensor feedback, and particularly video feedback, that can aid remote manual targeting presents a significant improvement in the state of the art of low-cost munition targeting, and permits a human to confirm/verify/fine-tune the targeting of a steerable munition while the munition is falling to its target. By supplying a glidable/steerable projectile with a video camera, preferably in the nose of the projectile, a radio transmitter to transmit collected video signals from the video camera tens of kilometers away during projectile flight (either to the site of launch, or to some other ground station or loitering air station for retransmission), a radio receiver to receive guidance commands, and a power source, preferably a supercapacitor, the projectile can activate the guidance system no sooner than required, transmit collected video signals, receive enhanced targeting commands, and more accurately glide and/or steer toward a designated target. This entire targeting/guidance process can happen in just a few seconds or tens of seconds as the projectile completes its flight, but can nevertheless mean the difference between precise and imprecise targeting, and target saturation with a single projectile versus target saturation with multiple/numerous projectiles lacking such apogee-detection, sensor transmission, and guidance/steering capabilities. As described previously, such guidance applications can require accurate apogee detection so as to timely activate the power-consumptive guidance systems no sooner than necessary but no later than useful.

It will be apparent to those skilled in the art that various modifications and variations can be made to the present invention without departing from the spirit and scope of the invention. Thus, it is intended that the present invention cover the modifications and variations of this invention provided they come within the scope of the appended claims and their equivalents.

We claim:

1. A method of reconfiguring the airframe of a ballistic projectile and arming the ballistic projectile comprising:
   firing or launching a ballistic projectile having a fuze and a self-contained apogee detection module;
   the self-contained apogee detection module detecting or predicting the projectile's ballistic apogee by computing a ballistic trajectory estimate using a plurality of sensors each having a measurement signal associated therewith and a computer processor all within the projectile and without reference to barometric pressure;
   at the detected or predicted apogee or at some time related thereto, the apogee detection module transmitting a signal to the fuze that arms the fuze and reconfigures the airframe of the ballistic projectile, and
   firing or launching an unmanned aerial vehicle (UAV) and/or an additional ballistic projectile,
   wherein the ballistic projectile, the additional ballistic projectile, and/or the UAV comprises an image or video sensor that captures image or video data that is transmitted to a remote user for target identification and guidance of the ballistic projectile, the additional ballistic projectile, and/or the UAV.

2. The method of claim 1, wherein the sensors include at least an accelerometer, a magnetometer, and a gyroscope, but do not include a pressure sensor.

3. The method of claim 1, wherein the computer processor fuses and processes the measurement signals using a quaternion extended Kalman filter to provide the ballistic trajectory estimate.

4. The method of claim 1, wherein the computation is performed without any a priori knowledge of the projectile's intended ballistic trajectory.

5. The method of claim 1, wherein the computation is performed in real time during flight.

6. The method of claim 1, wherein the projectile does not comprise a GPS antenna or other system for processing GPS signals.

7. The method of claim 1, wherein the projectile further comprises deployable flow effectors for steering and/or gliding toward a target, which are deployed upon receiving the apogee detection module signal.

8. A method of steering a ballistic projectile comprising:
   firing or launching a ballistic projectile having a body and a nose;
   detecting or predicting the projectile's ballistic apogee by computing a ballistic trajectory estimate using a plurality of sensors each having a measurement signal associated therewith and a computer processor all enclosed entirely within the projectile and without reference to barometric pressure; and
   at the detected or predicted apogee or at some time related thereto, actuating at least one flow effector to steer the ballistic projectile,
   wherein the projectile further comprises a video camera located in the nose of the projectile and a guidance system located in the body of the projectile, the guidance system comprising a radio frequency transmitter capable of transmitting video signals from the video camera and a radio frequency receiver capable of receiving guidance commands, and wherein the guidance system is activated and consumes power only upon receiving a signal indicative of detected or predicted apogee from the computer processor, and wherein the guidance commands adjust the angle of attack of the flow effector to steer the projectile toward a target.

9. The method of claim 8, wherein the sensors include at least an accelerometer, a magnetometer, and a gyroscope, but do not include a pressure sensor.

10. The method of claim 8, wherein the computer processor fuses and processes the measurement signals using a quaternion extended Kalman filter to provide the ballistic trajectory estimate.

11. The method of claim 8, wherein the computation is performed without any a priori knowledge of the projectile's dynamic state or the projectile's intended ballistic trajectory.

12. The method of claim 8, wherein the flow effector is a wing or a canard extended beyond the caliber of the projectile and for which the angle of attack is adjusted after extension.

13. The method of claim 12, wherein at least two dihedral wings and two steerable canards are deployed at some time prior to apogee based at least in part on the estimation of predicted apogee, and wherein the ballistic projectile subsequently steerably glides toward a target with a longer range than available from projectile's ballistic flight path.

14. The method of claim 12, wherein the ballistic projectile is reconfigured by supercaliber deployment of activatable flow control surfaces capable of being actuated to steer the projectile toward a target.

15. A method of reconfiguring the airframe of a ballistic projectile comprising:
firing or launching a ballistic projectile having a self-contained apogee detection module;
the self-contained apogee detection module detecting or predicting the projectile's ballistic apogee by computing a ballistic trajectory estimate using a plurality of sensors each having a measurement signal associated therewith and a computer processor all within the projectile and without reference to barometric pressure; and at the detected or predicted apogee or at some time related thereto, the apogee detection module transmitting a signal that reconfigures the airframe of the ballistic projectile,
wherein the reconfiguration is the deployment of an unmanned aerial vehicle (UAV) from the projectile, and the remainder of the projectile proceeds to descend toward a target while the UAV loiters in the air above the target.

16. The method of claim 15, wherein the sensors include at least an accelerometer, a magnetometer, and a gyroscope, but do not include a pressure sensor.

17. The method of claim 16, wherein the computer processor fuses and processes the measurement signals using a quaternion extended Kalman filter to provide the ballistic trajectory estimate.

18. The method of claim 17, wherein the projectile further comprises a video camera located in the nose of the projectile and a guidance system located in the body of the projectile, the guidance system comprising a radio frequency transmitter capable of transmitting video signals from the video camera and a radio frequency receiver capable of receiving guidance commands, and wherein the guidance system is activated and consumes power only upon receiving a signal indicative of detected or predicted apogee from the computer processor, and wherein the guidance commands adjust the angle of attack of the flow effector to steer the projectile toward a target.

19. The method of claim 17, wherein an additional ballistic projectile is fired or launched from the airframe or from the UAV, and the additional ballistic projectile is reconfigured by the supercaliber deployment of activatable flow control surfaces capable of being actuated to steer the projectile toward a target.

20. The method of claim 19, wherein the activatable flow control surfaces comprise at least two dihedral wings and at least two steerable canards deployed at some time prior to apogee based at least in part on the estimation of predicted apogee, and wherein the ballistic projectile subsequently steerably glides toward a target with a longer range than available from projectile's ballistic flight path.

* * * * *